US010989890B1

(12) United States Patent
Ando et al.

(10) Patent No.: US 10,989,890 B1
(45) Date of Patent: Apr. 27, 2021

(54) HEAT VENTING SHROUD FOR ARTIFICIAL REALITY HEAD MOUNTED DISPLAY

(71) Applicant: Facebook Technologies, LLC, Menlo Park, CA (US)

(72) Inventors: Mark Shintaro Ando, Seattle, WA (US); Kurt Jenkins, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 82 days.

(21) Appl. No.: 16/277,937

(22) Filed: Feb. 15, 2019

(51) Int. Cl.
| | | |
|---|---|---|
| *G02B 27/01* | (2006.01) | |
| *G02B 7/00* | (2021.01) | |
| *B22F 3/105* | (2006.01) | |
| *B33Y 80/00* | (2015.01) | |

(52) U.S. Cl.
CPC ............ *G02B 7/008* (2013.01); *B22F 3/1055* (2013.01); *G02B 27/0176* (2013.01); *B33Y 80/00* (2014.12)

(58) Field of Classification Search
CPC ............................ G02B 7/008; G02B 27/0176
See application file for complete search history.

(56) References Cited

U.S. PATENT DOCUMENTS

2017/0168303 A1* 6/2017 Petrov ................ G02B 27/0176

* cited by examiner

*Primary Examiner* — Joseph P Martinez
(74) *Attorney, Agent, or Firm* — Fenwick & West LLP

(57) ABSTRACT

A heat management device able to be manufactured using 3-D printing and corresponding to a body of a head mounted display system having an outer wall that partially encloses a chamber. The outer wall of the heat management device comprises a plurality of channels that traverse a thickness of the outer wall, each channel shaped to allow air to flow between the interior and exterior of the chamber, while preventing light from outside the chamber from entering the chamber. In some embodiments, each channel may be shaped to comprise a first portion and a second portion connected at an acute angle, the connection between the first and second portions serving to block a direct path for light to traverse between the ends of the channel.

20 Claims, 32 Drawing Sheets

HEAT VENTING SHROUD FOR ARTIFICIAL REALITY HEAD MOUNTED DISPLAY

BACKGROUND

The present disclosure generally relates to heat management systems, and specifically to a printable heat management device for use with an artificial reality head mounted display (HMD).

Heat management devices function to transfer heat from a heat source, or otherwise maintain a thermal state of an object in a desired manner. In the context of head mounted display systems, heat management devices can function to maintain or improve processing performance of such computing systems by preventing system overheating, as well preventing the temperature of the computing systems from creating an environment with a temperature that is uncomfortable for the wearer. However, such heat management devices may be heavy or allow outside light to undesirably effect the display of the head mounted display system, reducing a comfort of the wearer while also potentially reducing display quality.

SUMMARY

Embodiments relate to a system and method of manufacture of a heat management device. The heat management device comprises a body having at least one outer wall that partially encloses a chamber. The body of the heat management device is configured to be positioned adjacent to a surface of a heat source, such as an electronic display and/or other types of active electronics.

The outer wall of the heat management device body has an inner surface facing an interior of the chamber, an outer surface, and a plurality of channels traversing the thickness of the outer wall connecting the inner surface to the outer surface. Each channel comprises a first portion extending from the outer surface and a second portion extending from the inner surface, the first portion and the second portion of the channel connecting at an acute angle, such that light entering a first portion of the channel does not have a direct path to the second portion of the channel. However, heat may be dissipated from the interior of the chamber to a surrounding local area by air flow through the channels. In some embodiments, the heat management device may be manufactured using a 3D printing process.

Figure 1:
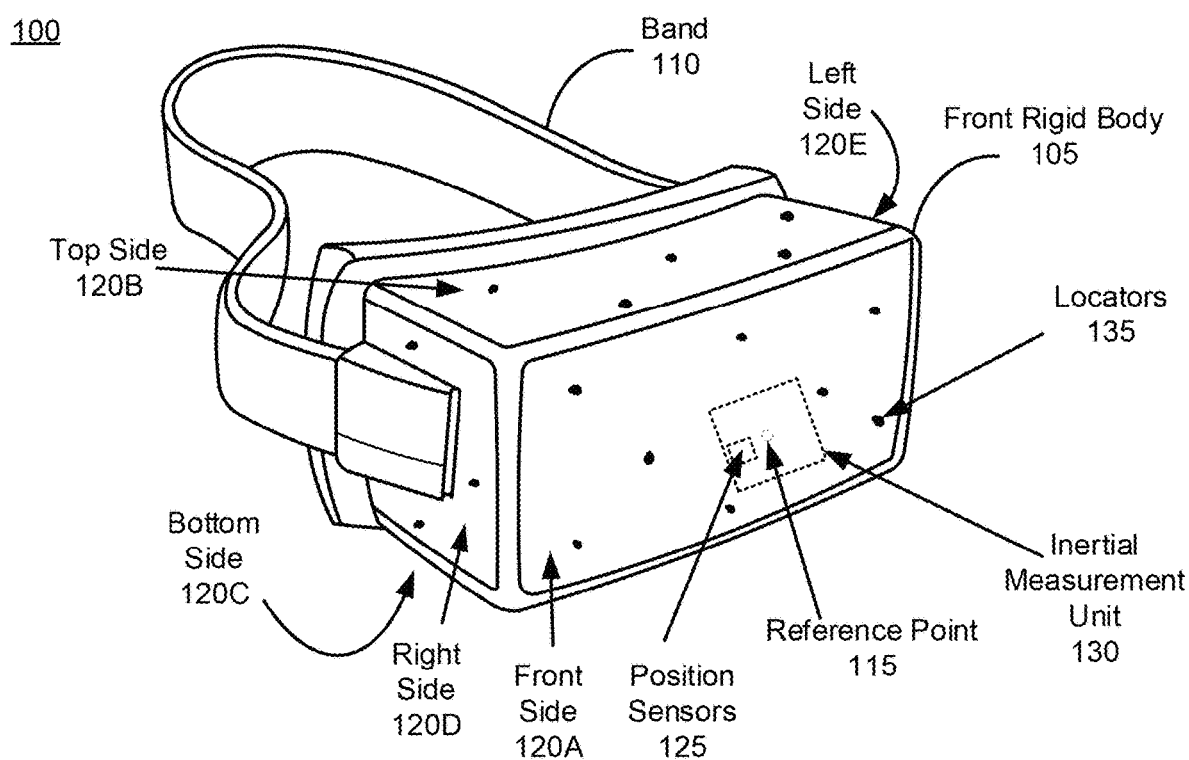
FIG. 1 is a diagram of a HMD, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Overview

A heat management device includes structures and materials that absorb heat from a heat source and reject heat away from the heat source. The heat management device may correspond to a body of a head mounted display system having an outer wall that partially encloses a chamber. The chamber may correspond to a chamber formed between a wearer's face and a display of the head mounted display system when the wearer wears the head mounted display system. The outer wall of the heat management device comprises a plurality of channels that traverse a thickness of the outer wall, each channel shaped to allow air to flow between the interior and exterior of the chamber, while preventing light from outside the chamber from entering the chamber. For example, each channel may be shaped to comprise a first portion and a second portion connected at an acute angle, the connection between the first and second portions serving to block a direct path for light to traverse between the ends of the channel. In some embodiments, the heat management device may be manufactured using 3D printing.

The heat management device functions to efficiently transfer heat from and dissipate heat away from a heat source. In the context of computing systems generating heat, the heat management device can function to improve or maintain proper performance of the computing systems by providing structures for efficient transfer of heat from the computing systems. As such, embodiments of the heat management device can enable greater performance from associated computing systems with devices similar in size to traditional heat management devices, or can alternatively enable approximately equivalent performance from associated computing systems with devices much smaller in size than traditional heat management devices.

The heat management device can additionally or alternatively function to provide structural support to systems or devices associated with the heat source, by utilizing thermally conductive materials having mechanical properties and/or structural features more suited to providing structural support than materials traditionally used in heat management devices.

In some embodiments, the heat management device may also function to increase a comfort level of a user of the computing system. For example, where the computing system comprises a wearable device such as an HMD, exposure to high temperatures may create discomfort for the wearer, decreasing user experience and making it difficult for the wearer to the wear the device for an extended period of time. The heat management device may reduce a temperature that the wearer is exposed to by dissipating heat produced by the active computing components of the computing system away from the user, potentially increasing the wearer's comfort when wearing the HMD. While the below description refers primarily to HMDs, it is understood that the heat management devices described herein may be used for other types of computing systems, such as wearable devices that are not HMDs.

FIG. 1 is a diagram of a HMD 100, in accordance with some embodiments. The HMD 100 may be a part of an artificial reality system. The HMD 100 includes a front rigid body 105 (having a front side 120A, top side 120B, bottom side 120C, right side 120D, and left side 120E), and a band 110. In some embodiments portions of a front side 120A of the HMD 100 are at least partially transparent in the visible band (~380 nm to 750 nm), and portions of the HMD 100 that are between the front side 120A of the HMD 100 and an eye of the user are at least partially transparent (e.g., a partially transparent electronic display).

The front rigid body 105 functions as a frame for the HMD 100, and is able to house active electronic components, such as one or more electronic displays (not shown in FIG. 1). The front rigid body 105 may also house one or more sensors (e.g., an inertial measurement unit (IMU), a position sensor, and/or the like). The front rigid 105 body is further configured to act as a heat management device for the housed electronic components (e.g., displays, sensors, etc.). In some embodiments, one or more sides of the front rigid body 105 may be covered a cover material, such as a breathable cloth material.

When the HMD 100 is worn by a wearer, the front rigid body 105 and the wearer's body (e.g., face) collectively define a chamber. As the display and other electronic components within the HMD 100 operate, they produce heat within the chamber. Without a way to manage (e.g., dissipate) the produced heat within the chamber, the HMD 100 may become uncomfortable for the wearer to wear over a period of time, as heat builds up within the chamber, potentially raising the temperature within the chamber to an uncomfortable level.

The front rigid body 105 of the HMD 100 is configured to function as a heat management device for the HMD 100 (e.g., as described below with regards to FIGS. 2-5), and may have one or more of an overall mass, an overall weight, a volume, density, and/or any other suitable physical property that supports a form factor that provides comfort to the user during a duration of use of the wearable device. In specific examples, due to material selection, morphological features, and low overall mass of the heat management device, the HMD 100 can have a low-weight, but structurally robust form factor that is comfortable for use over a duration of time, and is able to regulate an amount of heat and light within the chamber.

Figure 2:
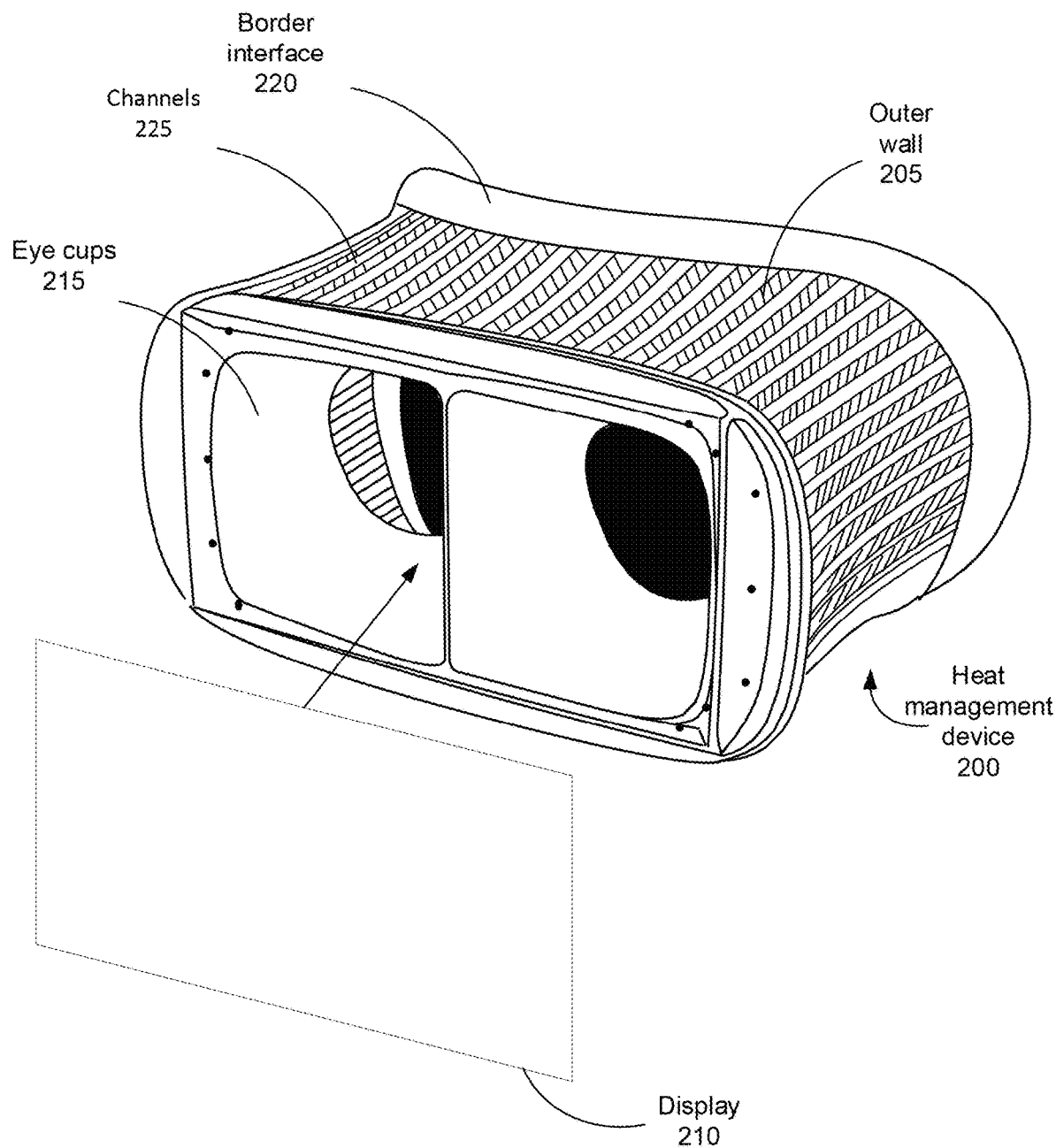
FIG. 2 illustrates a perspective view of a heat management device configured to dissipate heat, in accordance with some embodiments.

FIG. 2 illustrates a perspective view of a heat management device 200 configured to dissipate heat, in accordance with some embodiments. The heat management device 200 may correspond to a front rigid body (e.g., the front rigid body 105) or a portion of a front rigid body, and may be formed of a rigid, printable material, such as a powdered metal or plastic material. In some embodiments, the printable material may comprise a material that is thermally conductive (e.g., powdered metal), in order to assist in heat dissipation. By being able to manufacture the heat management device 200 using printing (e.g., 3D printing), the heat management device 200 may be able to be manufactured with features that are difficult or unobtainable using traditional manufacturing processes such as injection molding. In some embodiments, the heat management device 200 is manufactured (e.g., printed) as a single monolithic body.

The heat management device 200 has a body that comprises at least an outer wall 205, a display mounting area 210, one or more eye cups 215, and a border interface 220. The outer wall 205 defines to one or more side walls of the heat management device 200. In some embodiments, the outer wall 205 may be divided into separate walls for each side. In other embodiments, as illustrated in FIG. 2, the outer wall 205 comprises a continuous structure that defines multiple sides of the heat management device 200 (e.g., the top, bottom, left, and right sides of the heat management device 200). The outer wall 205 partially defines a chamber corresponding to an interior of the heat management device 200.

The display mounting area 210 of the heat management device 200 is located on one side (e.g., the front side 120A) of the heat management device 200, and contains one or more mounting features for mounting a display 230 configured to project light towards the eyes of a wearer to display one or more images. Example displays 230 includes a liquid crystal display (LCD), an organic light emitting diode (OLED) display, an active-matrix organic light-emitting diode display (AMOLED), a transparent OLED, some other display, or some combination thereof. Although FIG. 2 illustrates a single display 230, the display 230 may correspond to two separate displays (e.g., a left display and a right display).

The heat management device 200 provides structural support to the display 230 through the display mounting area 210. In some embodiments, the heat management device 200 further comprises a front wall (not shown), such that the display 230 is within the chamber partially defined by the heat management device 200. In other embodiments, a back surface of the display 230 may function as a front wall.

The heat management device 200 comprises a pair of eye cups 215 configured to direct light projected by the display towards the eyes of the wearer. For example, the eye cups 215 may divide the display 230 into left and right halves (or separate the left display and right display), and block light projected from the left half of the display from reaching the right eye of the wearer, and vice versa. In some embodiments, each of the eye cups is shaped as a frustrum (e.g., frustoconical) of opaque material, the inner face of each frustrum having one or more mounting features for mounting an optical element (not shown). The optical elements (e.g., a lens, etc.) may be configured to direct and focus the light projected by the display 210 towards the eyes of the wearer, and/or correct optical errors associated with the projected light. The optical elements include an aperture, a Fresnel lens, a convex lens, a concave lens, a filter, or any other suitable optical element that affects the image light emitted from the display 230. Moreover, the optical elements may include combinations of different optical elements. In some embodiments, each of the eye cups 215 may have one or more coatings, such as an anti-reflective coating, or one or more structural features (e.g., baffles) that reduce an amount of stray light within each eye cup 215.

While FIG. 2 illustrates the eye cups 215 as part of the heat management device 200, in alternate embodiments, the eye cups 215 may be implemented as part of a separate structure. For example, the eye cups 215 may be a separate component that is inserted within the chamber defined by the outer wall 205 of the heat management device 200. For example, the heat management device 200 may have one or more eye cup mounting features configured to attach to an inserted eye cup, allowing for the body of the heat management device 200 to provide structural support for the eye cups 215 and/or the optical elements attached to the eye cups 215.

The heat management device 200 may further comprise a border interface 220 contoured to fit a shape of the wearer's face. In some embodiments, the border interface 220 may have be attached to a soft or flexible material (e.g., a foam or rubber material, not shown), in order to achieve a more comfortable fit when the HMD is worn by a wearer. In addition, the material may serve to prevent gaps between the heat management device 200 and the wearer's face, reducing an amount outside light that is able to enter the chamber enclosed by the walls of the heat management device 200 and the wearer's face.

At least a portion of the outer wall 205 contains heat dissipation features that facilitate the dissipation of heat within the chamber. For example, the outer wall 205 has a plurality of channels 225 that traverse the thickness of the outer wall 205. Each channel 225 corresponds to a hollow structure traversing the thickness of the outer wall 205, having a first end facing an interior of the heat management device (e.g., the chamber) and a second end that faces the local area surrounding the heat management device 200. The channels 225 may be air channels that allow for air within the chamber to flow outside the chamber, and vice versa. By allowing for air flow between the inside and the outside of the chamber defined by the heat management device 200, the channels 225 act as vents that allow for heat produced within the chamber (e.g., by the display 210 and/or other active electronic components) to be vented outside the chamber into a local area around the HMD, potentially reducing a temperature within the chamber and preventing the chamber from reaching a temperature that would be uncomfortable for the wearer. As such, the wearer may be able to more comfortably wear the HMD for a longer period of time.

In some embodiments, the channels 225 are arranged in a plurality of columns. For example, as illustrated in FIG. 2, the channels 225 are arranged in a plurality of columns that run along a length of the heat management device 200 (e.g., the z-axis of a local coordinate system illustrated in FIG. 2, extending between the side of the heat management device 200 proximate to the display mounting area 210, and the border interface 220).

In some embodiments, the channels 225 are shaped in order to allow for air flow between the interior and exterior of the chamber, while preventing some or all outside light from the local area from entering the chamber (which may interfere with the light projected by the display 210), as well as light projected by the display 210 into the chamber from escaping outside the heat management device 200 into the local area, reducing a quality of the images viewed by the wearer. For example, each of the channels 225 may be configured to have a first portion and a second portion connected at an acute angle, in order to prevent light from passing through the channel 225 while still permitting air to flow between the opposite ends of the channel between the interior of the chamber and the local area outside the HMD. In some embodiments, the acute angle at which the first and second portions of each channel are connected may be between 15° and 60°).

Figure 3A:
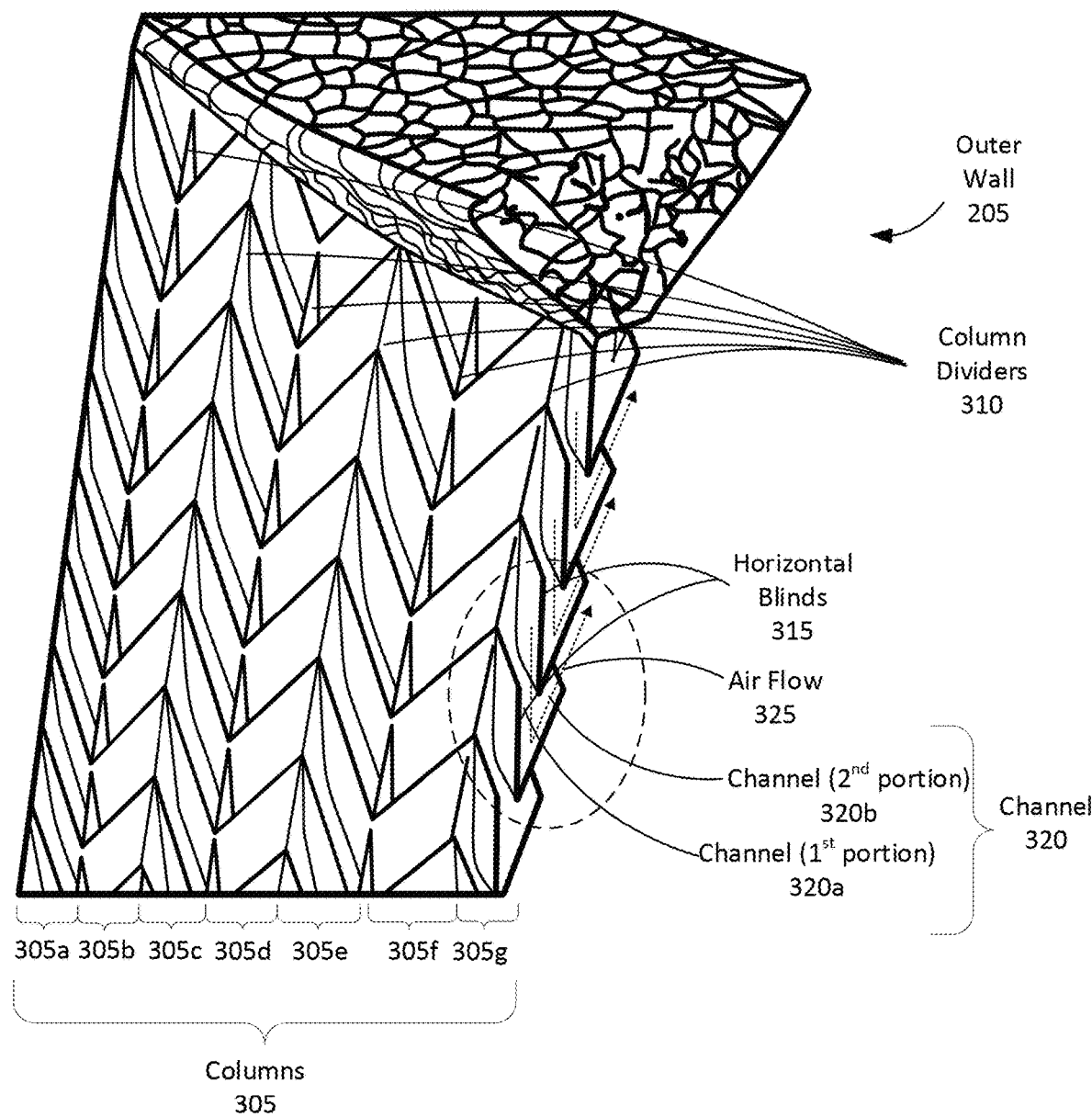
FIG. 3A illustrates a cross sectional perspective view of a portion of the outer wall of the heat management device of FIG. 2, in accordance with some embodiments.

FIG. 3A illustrates a cross sectional perspective view of a portion of the outer wall 205 of the heat management device 200 of FIG. 2, in accordance with some embodiments. As illustrated in FIG. 3A, the outer wall 205 of the heat management device 200 may comprise a plurality of channels arranged in a plurality of columns 305A-G. The columns 305 are defined by a plurality of column dividers 310 that serve as boundaries between the plurality of columns. Each of the column dividers 310 comprises a substantially flat strip of material having a width that spans across a thickness of the outer wall 205 (e.g., along the x-axis of the local coordinate system). For example, in some embodiments, the outer wall 205 may have a thickness of between 0.4 cm and 1 cm, and each column divider 310 may have thickness of between 1 mm and 3 mm (corresponding to the dimension of the column divider 310 along the y-axis).

As used herein with reference to FIG. 3A, a direction along the length of the column dividers 310 (along the z-axis) may be referred to as "vertical," while a direction along the width of the column dividers 305 (corresponding to the thickness between the inner and outer surfaces of the outer wall 205, along the x-axis) may be referred to as a "depth" or "thickness," and the direction spanning across the column dividers 310 (along the y-axis) may be referred to as "horizontal." As used herein, the inner surface of the outer wall 205 corresponds to a surface of the outer wall 205 facing the chamber partially enclosed by the heat management body 200, while the outer surface of the outer wall 205 corresponds to a surface facing the local area surrounding the heat management device 200.

The column dividers 310 of the outer wall 205 are connected via a plurality of horizontal blinds 315. As illustrated, the horizontal blinds 315 each span across the thickness of the outer wall 205 (e.g., extending between an inner and outer surface of the outer wall 205). The channels 320 may thus be formed as the space between adjacent pairs of column dividers 310 and adjacent pairs of horizontal blinds 315. For example, each channel 320 may have a top and bottom surface defined by respective horizontal blinds 315 above and below the channel, and left and right surfaces defined by respective column dividers 310 on either side of the channel. A plurality of channels 320 defined by a pair of horizontal blinds 315 spanning multiple columns 305 may be referred to as a "row." As such, the channels 320 may be considered to be arranged in a substantially rectangular array of rows and columns.

Each of the horizontal blinds 315 may have a substantially V-shaped cross section along the x-axis (between the inner and outer surfaces of the outer wall 205). As such, each channel 320 is divided into a first portion 320*a* and a second portion 320*b*. The first and second portions of the channel 320 may each extend respectively from the inner and outer surfaces of the outer wall 205, and are connected at an angle based upon the angle of the V-shaped cross section of the horizontal blinds 315. In some embodiments, the angle is an acute angle. The angle and height of the channel 320 (defined by the distance between adjacent pairs of horizontal blinds 315) may be configured such that light is blocked from directly passing through the channel 320, due to there being no direct path between the inner and outer surfaces of the outer wall 205 through the channel 320. On the other hand, air is able to flow through the channel 320 (e.g., represented by the air flow 325), allowing heat to be transferred across the outer wall 205. In some embodiments, the column dividers 310 and horizontal blinds 315 may each be made of or coated with a non-reflective material, in order to reduce an amount of light able to pass through the channels 320 through internal reflection.

In some embodiments, each of the horizontal blinds 315 further spans across the column dividers 310 in an alternating diagonal pattern, where each horizontal blind 315, as it horizontally spans the between adjacent pairs of column dividers 310, is slanted in a vertical direction (e.g., along the z-axis). For example, as illustrated in FIG. 3A, each horizontal blind 315 is slanted in a first vertical direction along the z-axis (e.g., increasing z with increasing y) as it spans the distance between the pair of column dividers 310 defining the column 305*c*, and in a second vertical direction along the z-axis (e.g., decreasing z with decreasing y) between the pair of column dividers 310 defining the column 305*d*.

As such, the channels 320 of the column 305*c* have parallelogram-shaped cross-sections slanted in a first direction, and channels 320 of the column 305*d* have parallelogram-shaped cross-sections slanted in a second direction. In some embodiments, by forming the horizontal blinds 315 to span across the column dividers in an alternating diagonal pattern, the ability of light to pass through the channels 320 may be further reduced. In addition, the alternating pattern of the horizontal blinds 315 may provide additional structural strength to prevent deformation of the heat management device 200.

By forming the outer wall 205 of the heat management device 200 as a network of channels traversing the thickness of the outer wall, heat from within the chamber can be dissipated to outside the chamber via air flow through the channels. On the other hand, the channels are formed with a shape that blocks outside light from entering the chamber and potentially affecting the images projected towards the wearer's eyes by the display. As such, temperature within the chamber can be prevented from reaching an uncomfortable level for the wearer relative to the outside environment, while minimizing an amount of outside light let into the chamber that could detract from the wearer's reviewing experience. In addition, the column dividers and horizontal blinds collectively define a plurality of structural shapes that lend structural durability to the outer wall 205, but have reduced weight in comparison to if the side wall were made of solid material.

In some embodiments, the border interface 220 adjacent to the outer wall 205 may be substantially hollow, enclosing material forming a mesh. The material mesh may be formed such that it is able to provide structural strength to the border interface 220, while reducing the weight of the border interface 220.

In some embodiments, the angles connecting the portions of each channel 320 cause the channels 320 to face in a certain direction. For example, as illustrated in FIG. 3A, the channels 320, due to the V-shape of the horizontal blinds 315, are oriented to face in the positive Z-direction (e.g., towards the border interface of the heat management device 200 and the wearer). In other embodiments, the channels may be configured to face in different directions. In addition, the angle of the V-shape of the horizontal blinds 315 may vary over different portions of the heat management device 200, based upon an expected orientation of the portion of the outer wall 205 that the channels 320 are on (e.g., top, bottom, or side surface of the HMD), and a desired level of heat and light management.

Figure 3B:
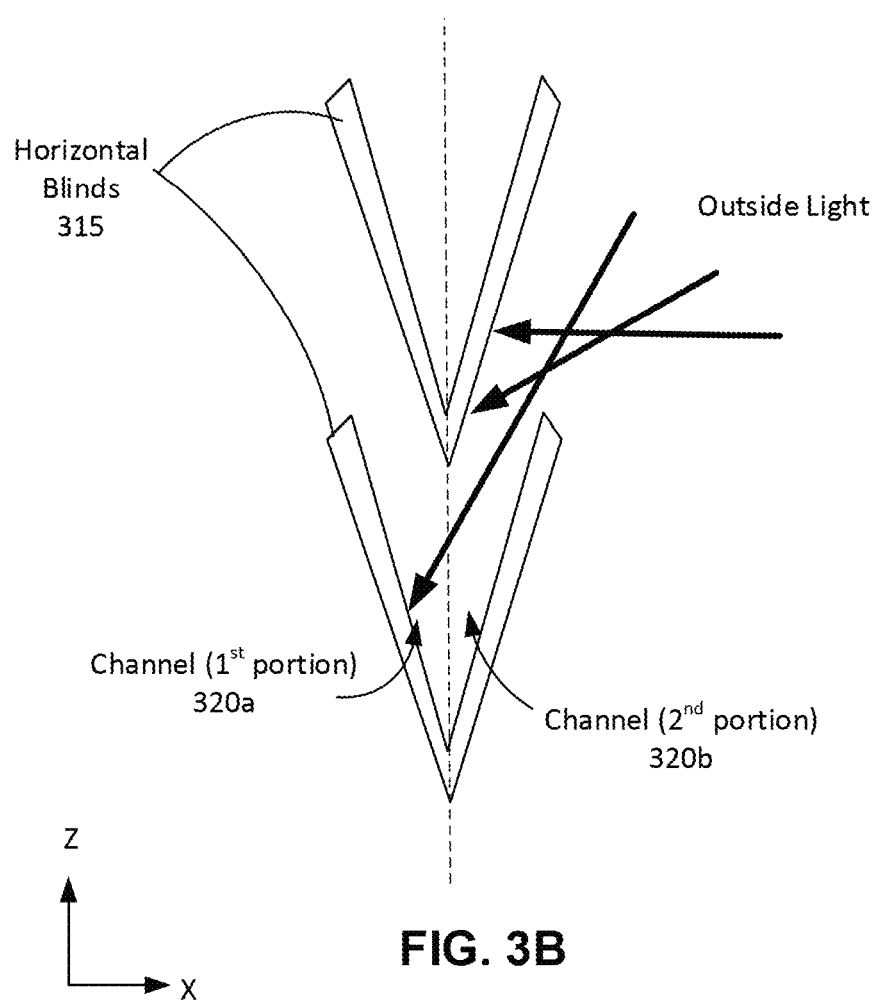
FIG. 3B illustrates a cross section view of a particular channel of FIG. 3A, in accordance with some embodiments.

FIG. 3B illustrates a cross section view of a particular channel 320 of FIG. 3A, in accordance with some embodiments. As illustrated in FIG. 3B, the channel 320 is bounded along the z-axis by a pair of horizontal blinds 315, each having a V-shaped cross section dividing the channel 320 into first and second portions 320a and 320b. For example, the channel 320 is bisected by a z-axis, with the first portion 320a on one side of the z-axis, and the second portion 320b on an opposite side of the z-axis. The horizontal blinds 315 are shaped and arranged such that outside light travelling towards the outer wall 205 is intercepted by a horizontal blind 315 and prevented from traversing across the channel 320.

Although the above description refers to column dividers 310 and horizontal blinds 315 as if they were different components, it is understood that in some embodiments, the first and column dividers 310 and horizontal blinds 315 (e.g., as illustrated in FIGS. 3A and 3B) may be attached to each other or correspond to different portions of a single integral structure. For example, in embodiments where the heat management device 200 is formed through a 3D printing process, the first and second diagonal strips 410a and 410b are formed together as part of the same outer wall structure.

Diamond Channel Pattern

While FIGS. 2 and 3A-3B illustrate a heat management device having channels arranged in columns, in other embodiments, the channels of the outer walls of the heat management device body may be arranged in other ways.

Figure 4:
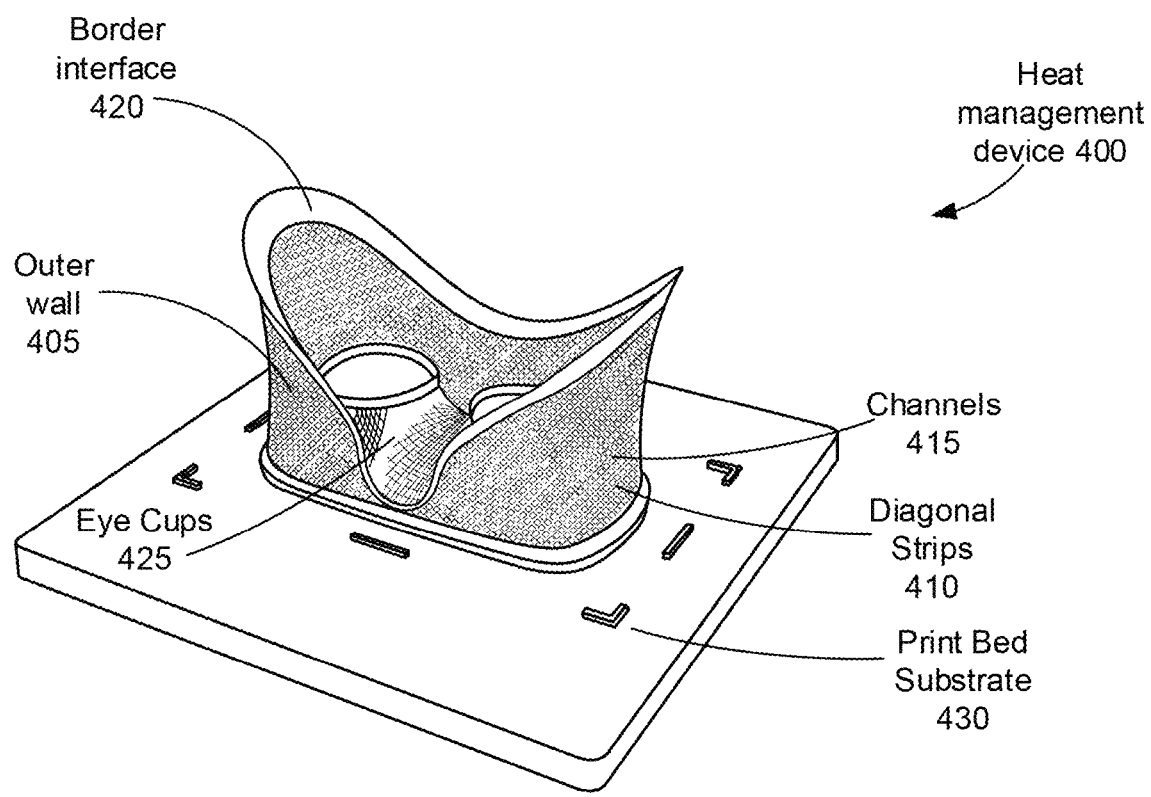
FIG. 4 illustrates a heat management device for an HMD being printed using a 3D printing technique, and having channels arranged in a diagonal array pattern, in accordance with some embodiments.

FIG. 4 illustrates a heat management device for an HMD being printed using a 3D printing technique, and having channels arranged in a diagonal array pattern, in accordance with some embodiments. The heat management device 400 illustrated in FIG. 4 may correspond to the front rigid body 105 illustrated in FIG. 1. As shown in FIG. 4, the heat management device 400 may be shaped in order to accommodate a wearer's face. For example, the heat management device 400 may be shaped to have an indentation for accommodating a nose of the wearer. The rigid body may comprise an outer wall 405, a display mounting area (not shown), eye cups 425, and a boundary interface 420 corresponding to an interface between the heat management device 400 and the wearer's face with the HMD is worn by the wearer. The boundary interface 420 may comprise a mesh of material in order to reduce weight while maintaining structural strength.

The heat management device 400 may be manufactured using a 3D printing technique. For example, a manufacturing system (e.g., 3D printing system) may receive a design for the heat management device 400 comprising a plurality of cross section layers. The manufacturing system begins printing on a print bed substrate, and adjusts the print bed substrate height to print each cross section layer at an appropriate height and to bond the printed layer, in sequence, to a running build of the body. In this configuration, as illustrated in FIG. 4, the body of the heat management device 400 can be built from the bottom upward, relative to the orientation of the body at the print bed substrate, starting from a side of the heat management device 400 proximate to the display mounting area, and building towards the border interface 420.

The outer wall 405 comprises a network of channels 415 arranged in a diagonal array pattern. Instead of column dividers and horizontal blinds as illustrated in FIG. 3, the channels 415 of the outer wall 405 may be defined by a first set of parallel diagonal strips 410 oriented in a first direction, and a second set of parallel diagonal strips 410 oriented in a second direction (e.g., substantially orthogonal to the first direction). Each of the diagonal strips 410 is oriented diagonally across the thickness of the outer wall 405 (e.g., oriented relative to the thickness of the outer wall 405 by an angle, such as a 45°), such that the channels 415 defined between pairs of diagonal strips of the first and second sets are able to allow for air flow between the interior and exterior of the heat management device 400, while being shaped such that there is no direct path for outside light to enter the interior of the rigid body through the outer wall 405.

In addition, as illustrated in FIG. 4, one or more channels may be formed on portions of the eye cups 425. The channels on the eye cups 425 may be formed in a manner similar to those on the outer wall 405 (e.g., between sets of diagonal strips spanning the thickness of the eye cup material, the diagonal strips aligning with the contours of the eye cups 425). The eye cup channels may allow heat produced by a display (not shown) to travel through the eye cups 425 into the chamber defined by outer wall 405, and to dissipate from the interior of the chamber via air flow through the channels of the outer wall 405.

Figure 5:
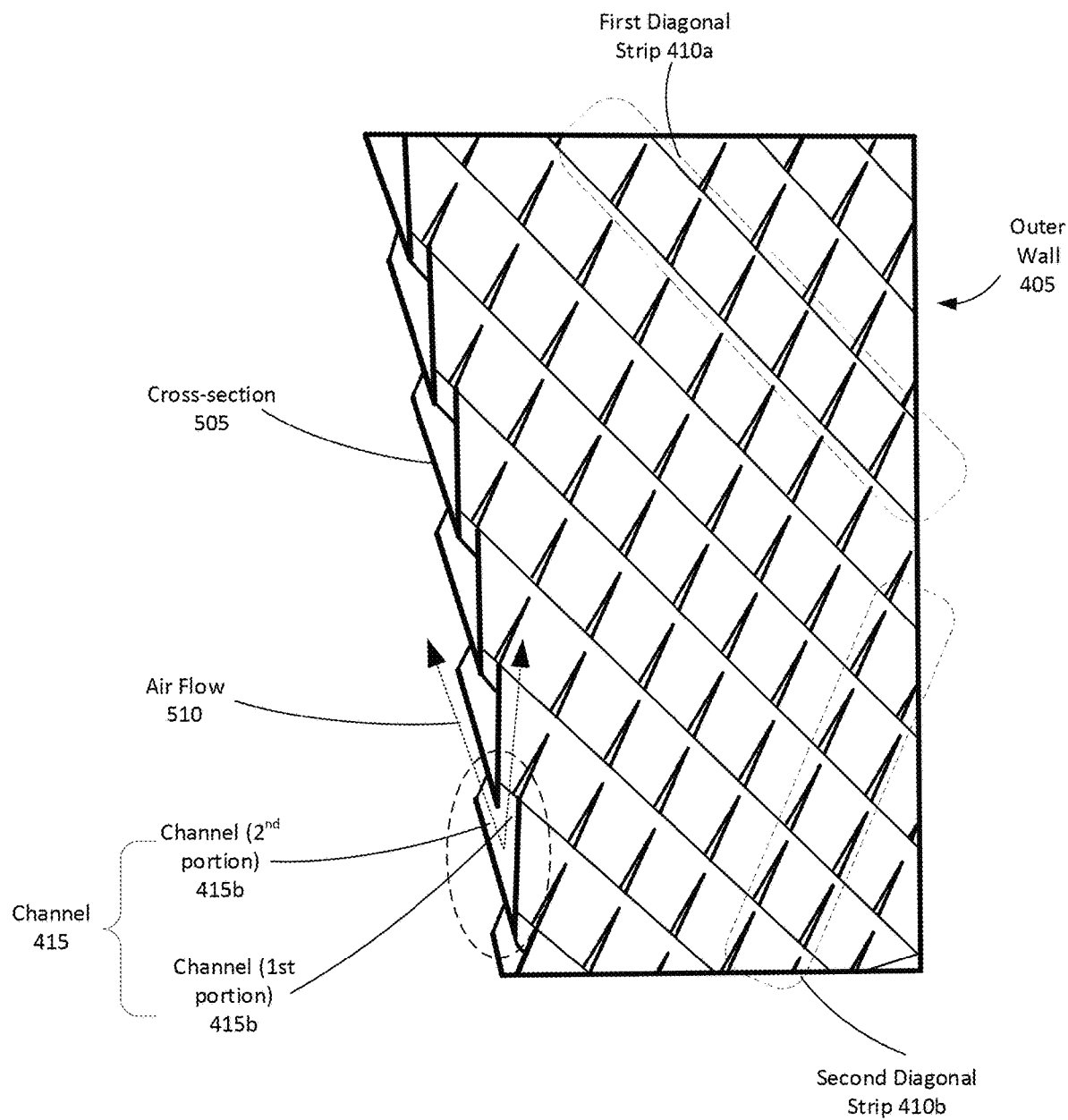
FIG. 5 illustrates a cross sectional perspective view of a portion of the outer wall of the heat management device of FIG. 4, in accordance with some embodiments.

FIG. 5 illustrates a cross sectional perspective view of a portion of the outer wall of the heat management device of FIG. 4, in accordance with some embodiments. As illustrated in FIG. 5, the outer wall 405 of the heat management device 400 comprises a plurality of channels 415. The channels 415 are defined by a plurality of diagonal strips 410, comprising a set of first diagonal strips 410a extending in a first direction, and a set of second diagonal strips 410b extending in a second direction that is substantially orthogonal to the first direction along the plane of the outer wall 405 (e.g., along the X-Z plane). In some embodiments, each diagonal strip 410 has a V-shaped cross section 505 extending across the thickness (e.g., Y-direction) of the outer wall 405. In some embodiments, the V-shaped cross-sections of the diagonal strips 410 each define an acute angle.

Each of the channels 415 is defined by the space between the V-shaped cross-sections of adjacent pairs of diagonal channels of the first diagonal strips 410a and second diagonal strips 410b. Each channel 415 is divided into a first portion 415a and a second portion 415b based upon the V-shaped cross-sections of the surrounding diagonal strips 410, wherein the first and second portions 415a and 415b are connected at an angle that allows air to flow (e.g., represented in FIG. 5 by air flow 510) between opposite sides of the outer wall 405, but blocks light from directly passing through the channel 415. In some embodiments, the channels 415 are arranged in a substantially diagonal pattern, based upon the orientations of the diagonal strips 410.

Although the above description refers to first and second diagonal strips 410a/410b as if they were different components, it is understood that in some embodiments, the first and second diagonal strips 410a/410b as illustrated in FIG. 5 may be attached to each other or correspond to different portions of a single integral structure. For example, in embodiments where the heat management device 400 is formed through a 3D printing process, the first and second diagonal strips 410a and 410b are formed together as part of the same outer wall structure.

Method of Manufacture

Figure 6:
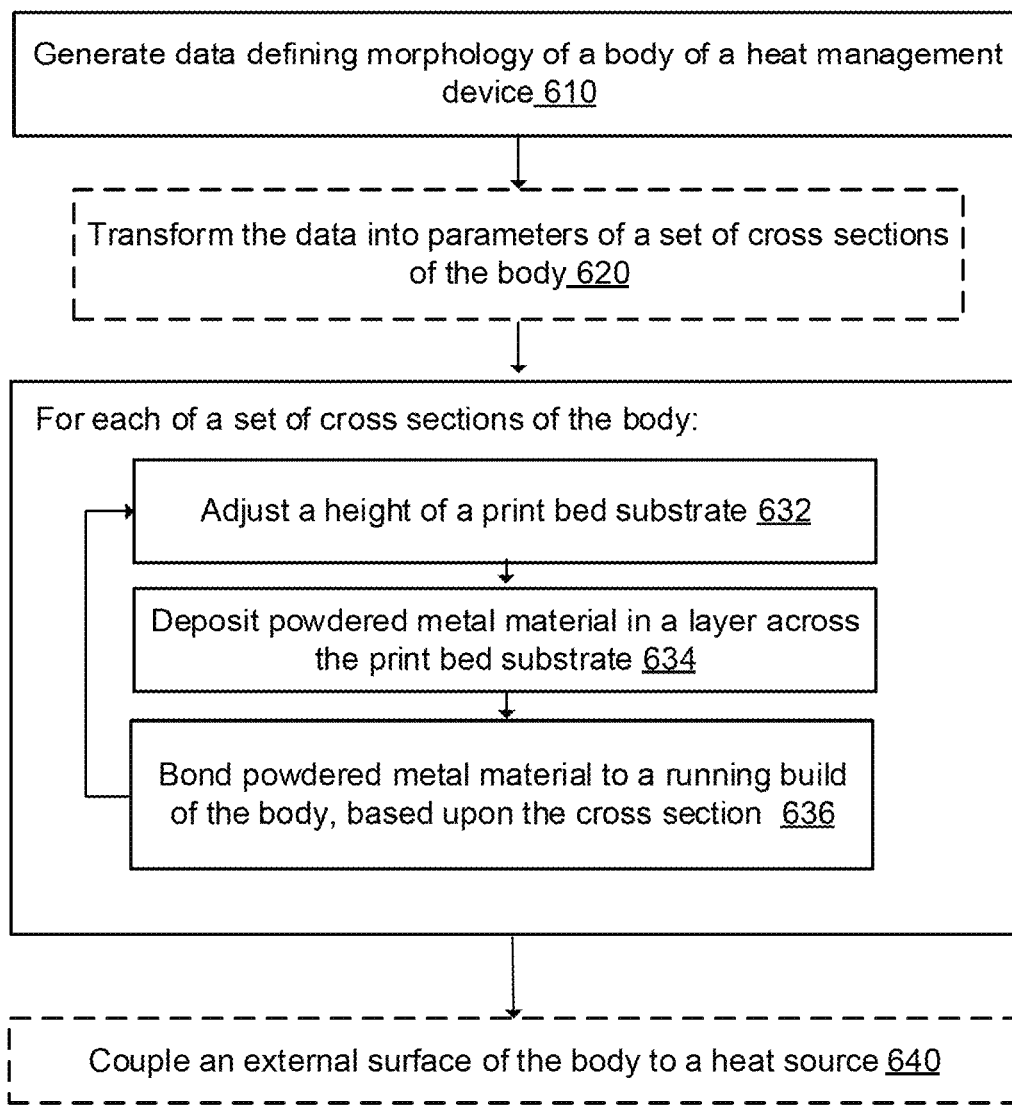
FIG. 6 depicts a flow chart of a method of manufacture of a heat management device, in accordance with some embodiments.

In some embodiments, the heat management device (e.g., the heat management device 200 or 400) of an HMD may be manufactured using a 3D printing system. FIG. 6 is a flowchart of a method 600 of manufacture of a heat management device, in accordance with one or more embodiments. The method 600 of FIG. 6 may be performed using a manufacturing system. The manufacturing system may include a computer-aided design (CAD) system in communication with a 3D printing system that builds components using powdered metal material. In embodiments, as described below, the 3D printing system may include a selective laser melting (SLM) or direct metal laser sintering (DMLS) system that includes a print bed coupled to an actuator, a metal powder depositor that provides and distributes metal powder across the print bed (e.g., using a roller), and a heat generator (e.g., laser, electron beam source, etc.) coupled to an actuation system that moves the heat generator relative to the print bed during a build process. Other entities may perform some or all of the steps of the method in other embodiments. Likewise, embodiments may include different and/or additional steps, or perform the steps in different orders. The method 600 functions to generate a custom heat management solution using an untraditional process and untraditional materials for such heat management devices, that allow for structural and operational improvements to existing technologies, as described above.

The manufacturing system generates 610 data defining morphology of a body of the heat management device in order to generate computer-readable data that defines external and/or internal morphological features of the body of the heat management device. The data may define features of embodiments, variations, or examples of outer walls of the heat management device described above. The computer-readable data may be data in a three-dimensional computer-CAD format or any other suitable format that can be processed in in downstream steps of the method 600.

The manufacturing system transforms 620 the data into parameters of a set of cross sections of the body in order to transform the data into a format that can be used by a 3D printing system. In relation to the manufacturing process, The CAD system can transform 620 the data by dividing volumetric data into two-dimensional cross sections of the body, wherein division into cross sections is based on one or more of: appropriate orientation of the body within a build chamber or on a substrate associated with the manufacturing process; cross-section thickness associated with appropriate thicknesses for each section being bonded to a running build of the body; feature resolution capabilities of the manufacturing apparatus; and any other suitable factor. Dividing the data into cross sections can be implemented automatically using a sectioning algorithm that uses manufacturing-related considerations as boundary constraints. Alternatively, dividing the data into cross sections can be implemented manually. Still alternatively, the CAD system can directly generate 620 cross sectional data and omit generating 610 volumetric data of the body.

The data is received by the manufacturing system (e.g., a 3D printing system of the manufacturing system) and, for each of the set of cross sections of the body, the manufacturing system adjusts 632 a height of a print bed substrate, the manufacturing system deposits 634 powdered metal material in a layer across the print bed substrate, and the manufacturing system bonds 636 powdered metal material to a running build of the body, based upon the cross section.

The manufacturing system adjusts 632 the print bed substrate height, and may lower the print bed substrate to an appropriate height that allows a cross section to be bonded, in sequence, to a running build of the body. In this configuration, the body can be built from the bottom upward, relative to the orientation of the body at the print bed substrate. For example, FIG. 4 illustrates the heat management device 400 positioned on a print bed substrate 430. The 3D printing system may additionally or alternatively adjust a height or lateral position of the print bed substrate in any other suitable manner, for each cross sectional layer being built.

The manufacturing system deposits 634 powdered metal material and may deliver an appropriate volume of powdered metal material onto the print bed substrate and, simultaneously or in a subsequent step, ensure that the volume of powdered metal material is distributed uniformly (e.g., in a uniformly-thick layer) across the print bed substrate. The powdered metal material can have a composition suited to the application of use of the heat management device, as described in relation to the system above. The powdered metal material can also have a particle size (and level of uniformity in particle size) that produces desired surface characteristics for the final product (e.g., in terms of allowable roughness, in terms of allowable porosity, etc.). In specific examples, the particle sizes of the powdered metal material used are below 30 microns in diameter; however particle sizes of the powdered metal material used can alternatively be greater than or equal to 30 microns in diameter (e.g., up to 200 microns in diameter).

The manufacturing system bonds 636 powdered metal material and may melt or sinter powdered material of the layer deposited onto a running build of the body retained at the print bed substrate. Bonding 636 by the 3D printing system can be implemented using a laser coupled to an actuator that produces movement of the laser relative to the print bed substrate in one or more lateral directions, wherein activation and/or deactivation of the laser selective bonds material to the running build. The laser can additionally or alternatively be optically coupled to optical elements (e.g., lenses, mirrors, etc.) that adjust features of the laser output incident on the desired build surface. Bonding parameters can be based upon one or more of: powdered metal material particle size, powdered metal material composition, mass of actuator components (e.g., gantry mass, laser head mass, etc.) coupled to the laser, laser output-associated parameters (e.g., wavelength, power, intensity, irradiance, beam shape, etc.), build environment parameters (e.g., volume of a build environment, oxygen content in build environment, other gas content in build environment, temperature of build environment, etc.), and any other suitable build parameters. In a specific example, the 3D printing system can use a fiber laser (e.g., ytterbium fiber laser). In alternative variations, the 3D printing system can use an electron beam output device or any other suitable source of energy that causes metal particles to melt or be sintered to a running built of the body.

In some embodiments, the manufacturing system may optionally perform a surface treatment on the printed body. For example, the printed heat management device may be covered or coated with a material to reduce an amount of light reflected from the surface of the heat management device, potentially reducing an amount of light that is able to enter the chamber defined by the outer walls of the heat management device via reflection through the channels of the outer wall.

The manufacturing system may optionally include a fastening system, which can couple 640 an external surface of the body to a heat source (e.g., a display). Coupling the body to a heat source functions to establish a thermal interface between the heat management device and the heat source in order to provide a mechanism for efficient heat rejection from the heat source. Coupling the body to the heat source also functions to allow the heat management device to structurally support the heat source and/or other device components associated with the heat source in a manner not achievable before. The fastening system can implement mechanical fasteners (e.g., screws, bolts, etc.), adhesives, thermal fastening elements, magnetic fasteners, and/or any other suitable type of fastener.

While the above process describes a method for manufacturing a heat management device using 3D printing, in accordance with other embodiments, it is understood that embodiments of a heat management device can alternatively be produced according to other methods, such as using a mold.

Views of Heat Management Devices

FIGS. 7-31 illustrate additional views of heat management devices in accordance with some embodiments. FIGS. 7-18 illustrate views of a heat management device having channels defined by columns and horizontal blinds, while FIGS. 19-31 illustrate views of a heat management device having channels defined by diagonal strips.

Figure 7:
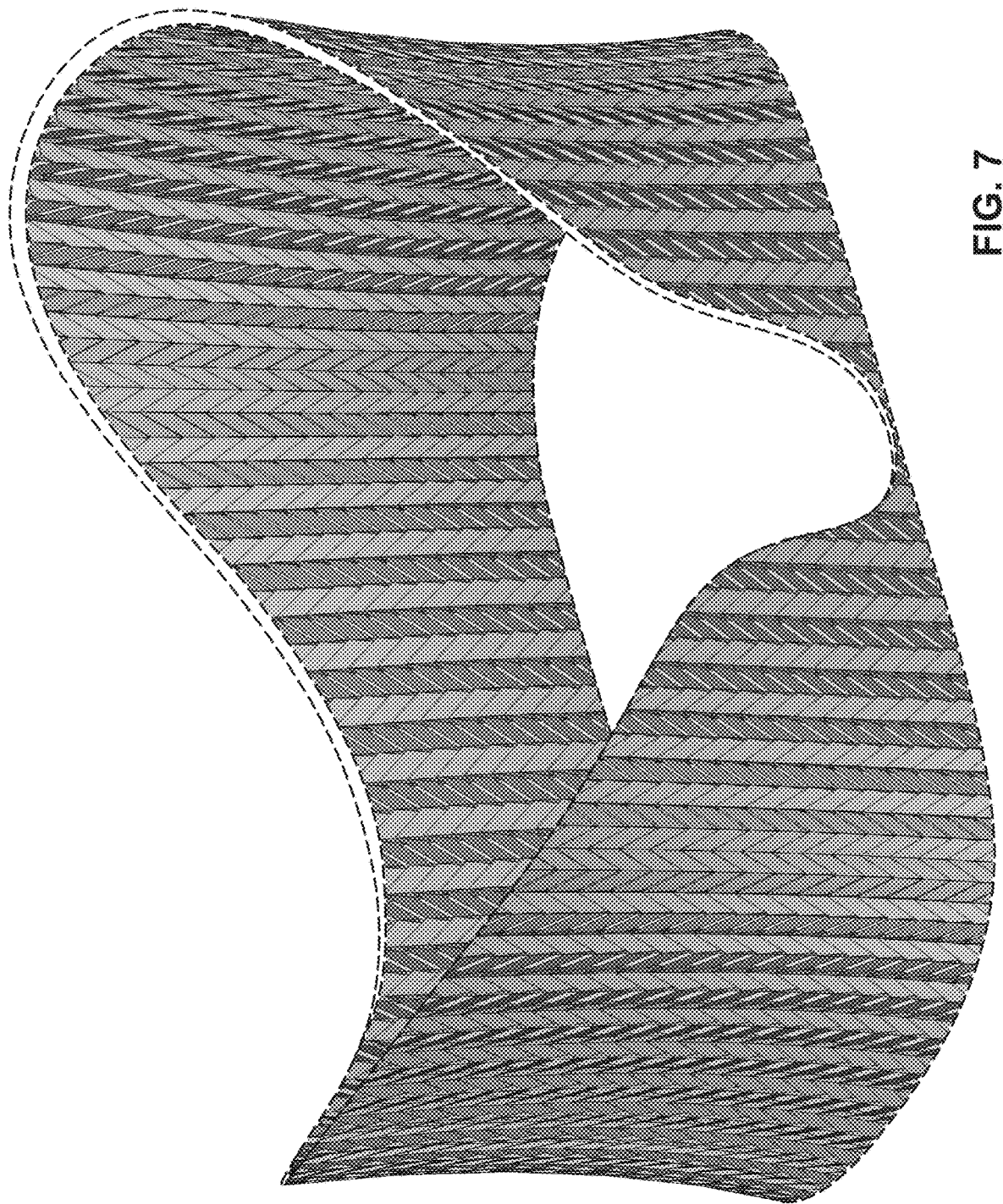
FIG. 7 is an isometric view of a heat management device having channels defined by columns and horizontal blinds, in accordance with some embodiments.
Figure 8:
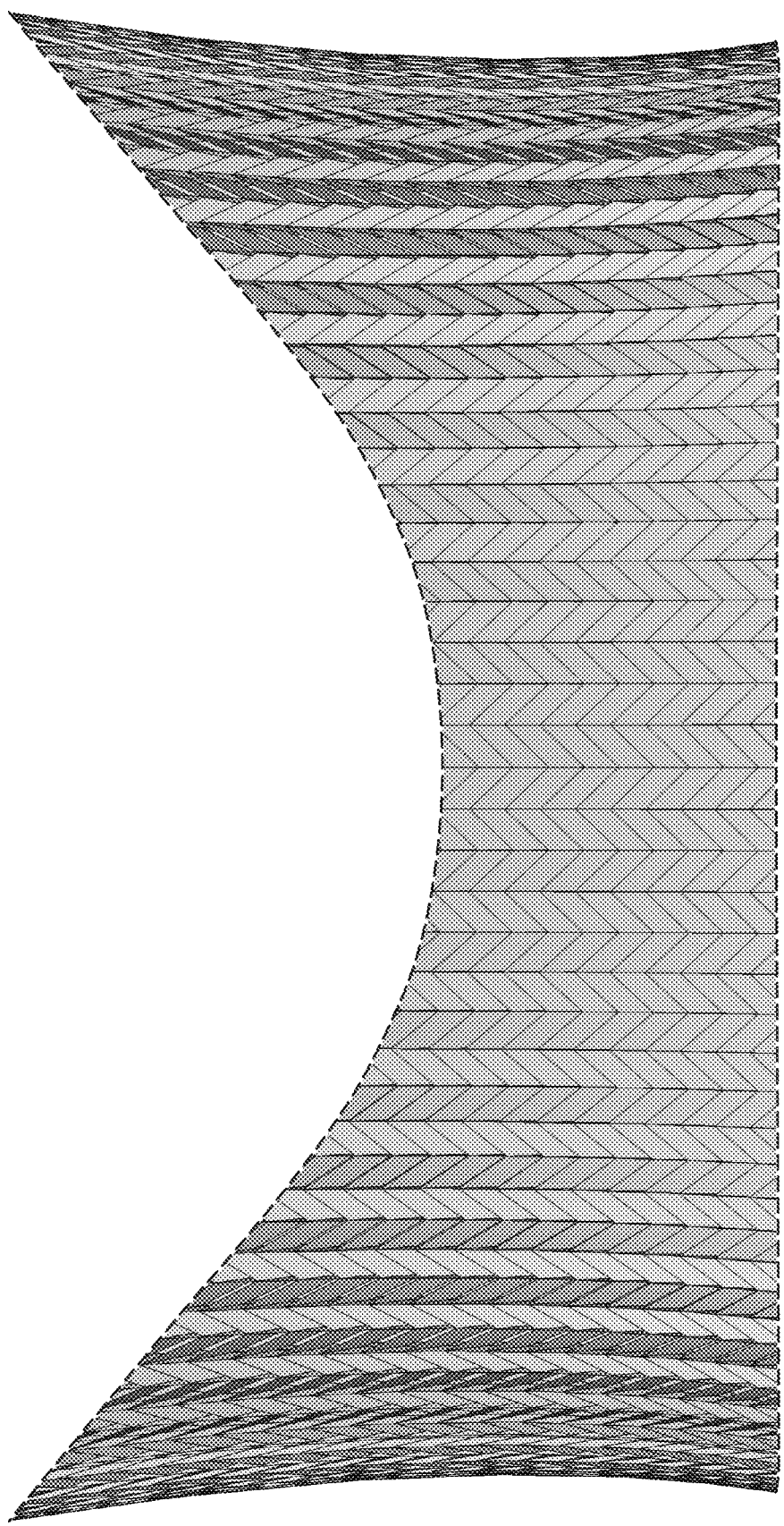
FIG. 8 is a top view of the heat management device illustrated in FIG. 7.
Figure 9:
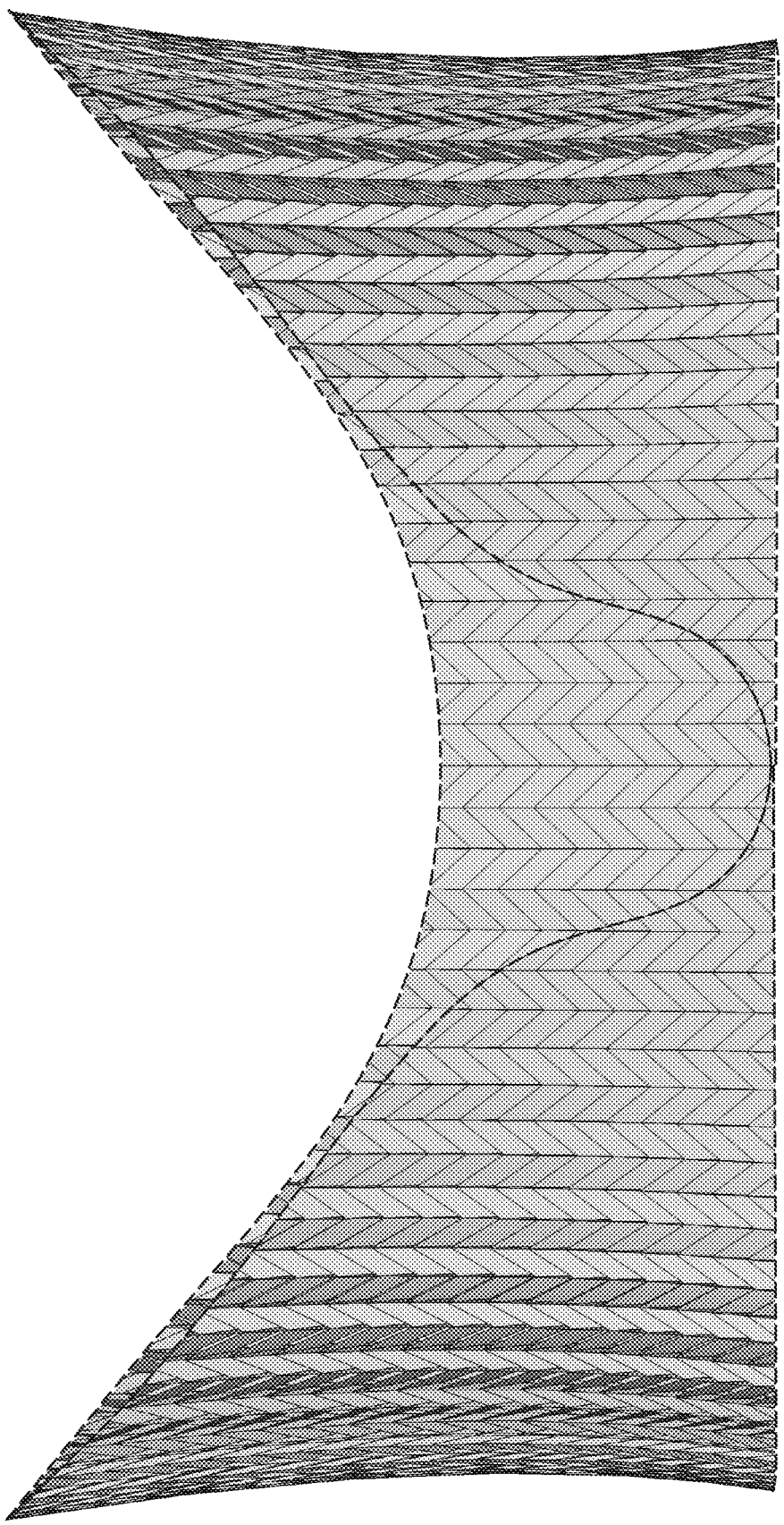
FIG. 9 is a bottom view of the heat management device illustrated in FIG. 7.
Figure 10:
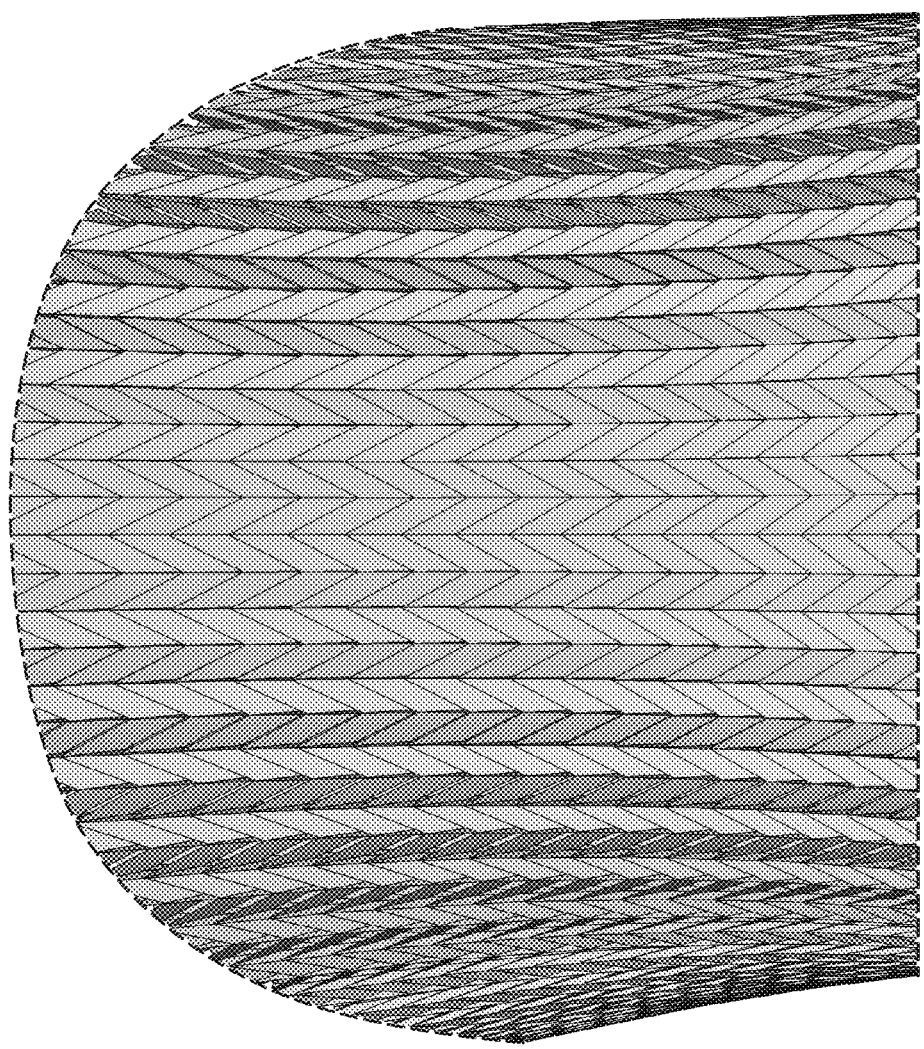
FIG. 10 is a left view of the heat management device illustrated in FIG. 7.
Figure 11:
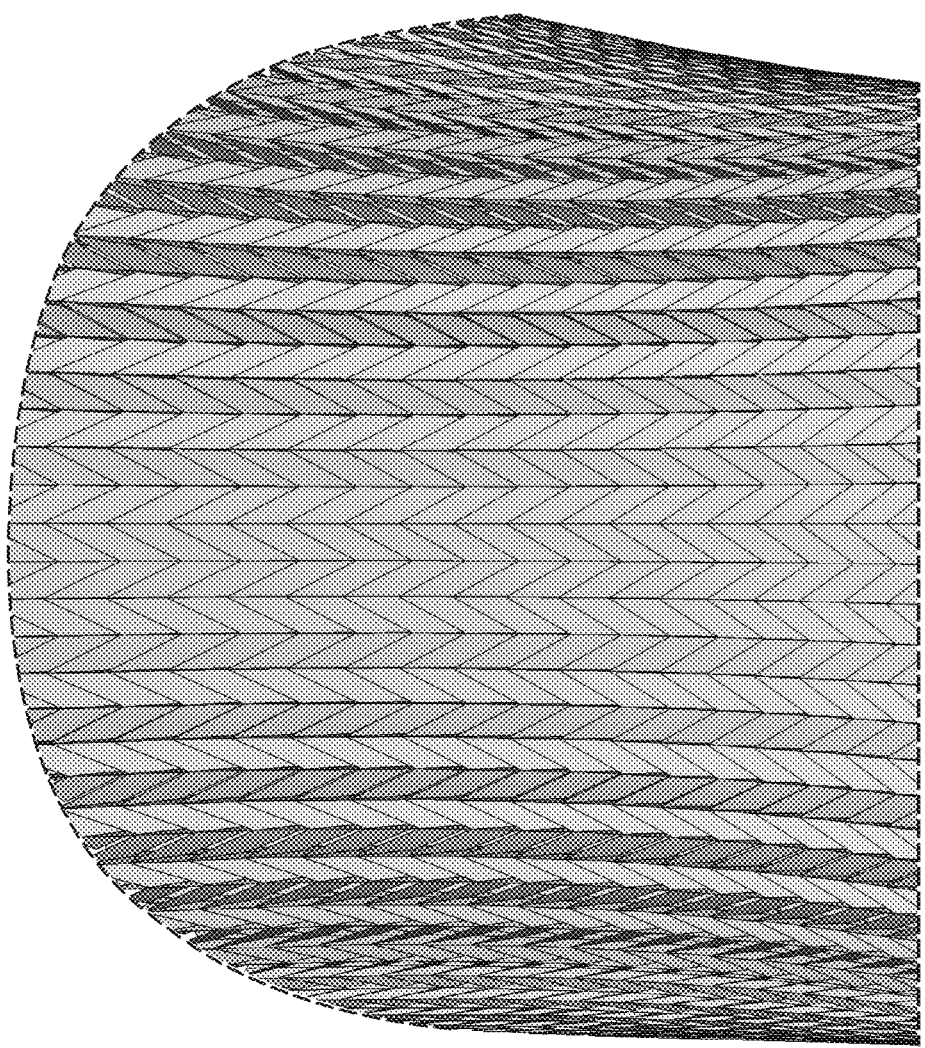
FIG. 11 is a right view of the heat management device illustrated in FIG. 7.
Figure 12:
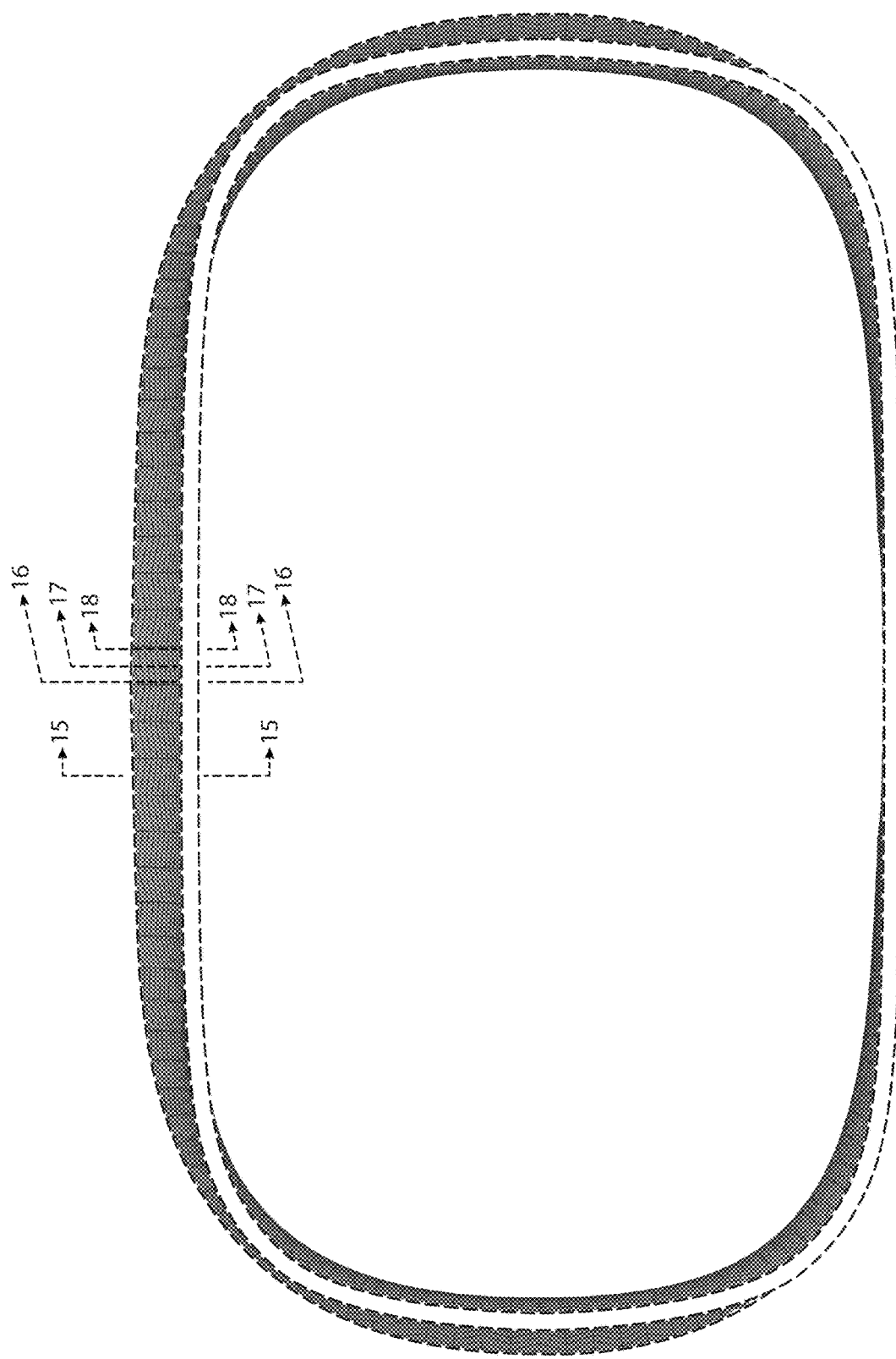
FIG. 12 is a front view of the heat management device illustrated in FIG. 7.
Figure 13:
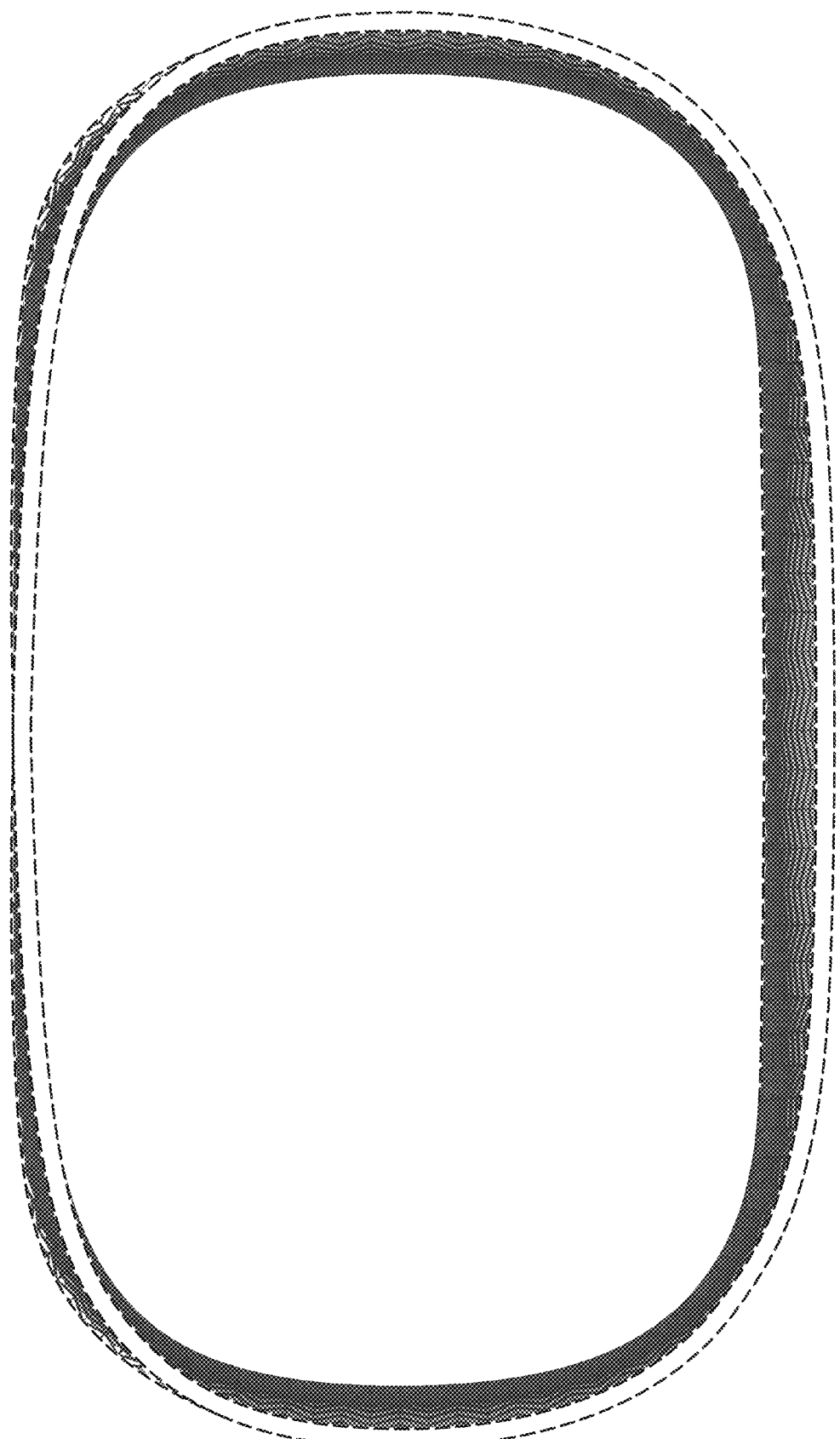
FIG. 13 is a back view of the heat management device illustrated in FIG. 7.
Figure 14:
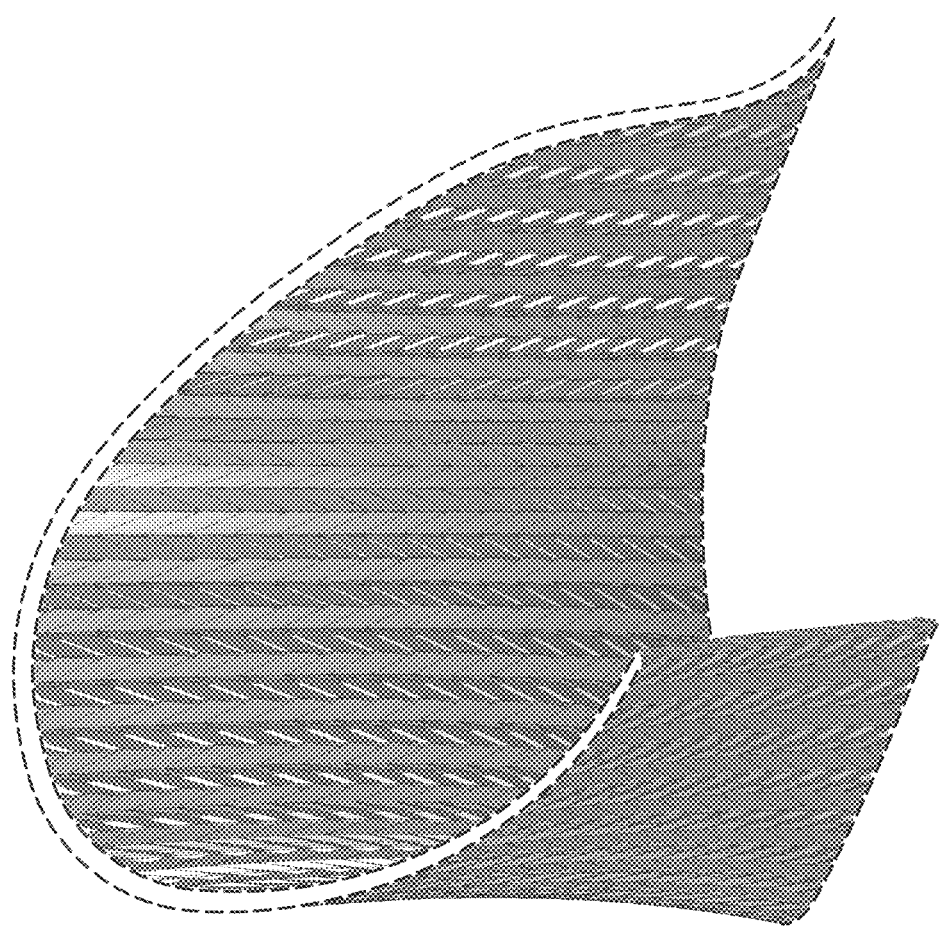
FIG. 14 is an isometric cross-section view of the heat management device illustrated in FIG. 7.
Figure 15:
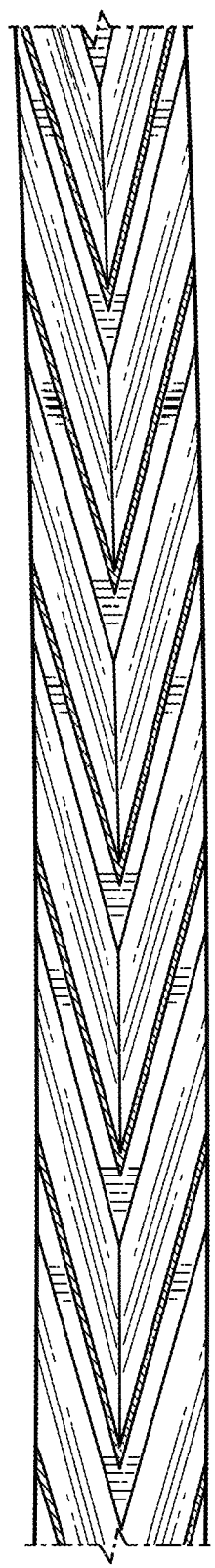
FIG. 15 is a head-on cross sectional view of a portion of the outer wall of the heat management device illustrated in FIG. 7.
Figure 16:
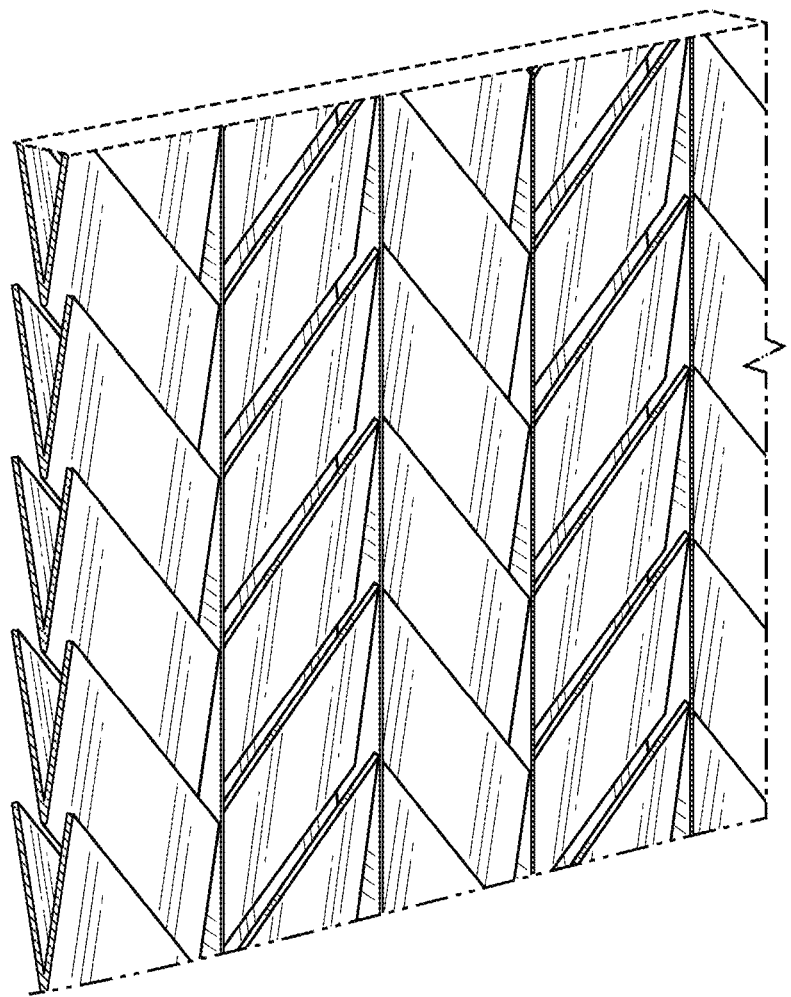
FIG. 16 is a cross sectional perspective view of a portion of the outer wall of the heat management device illustrated in FIG. 7.
Figure 17:
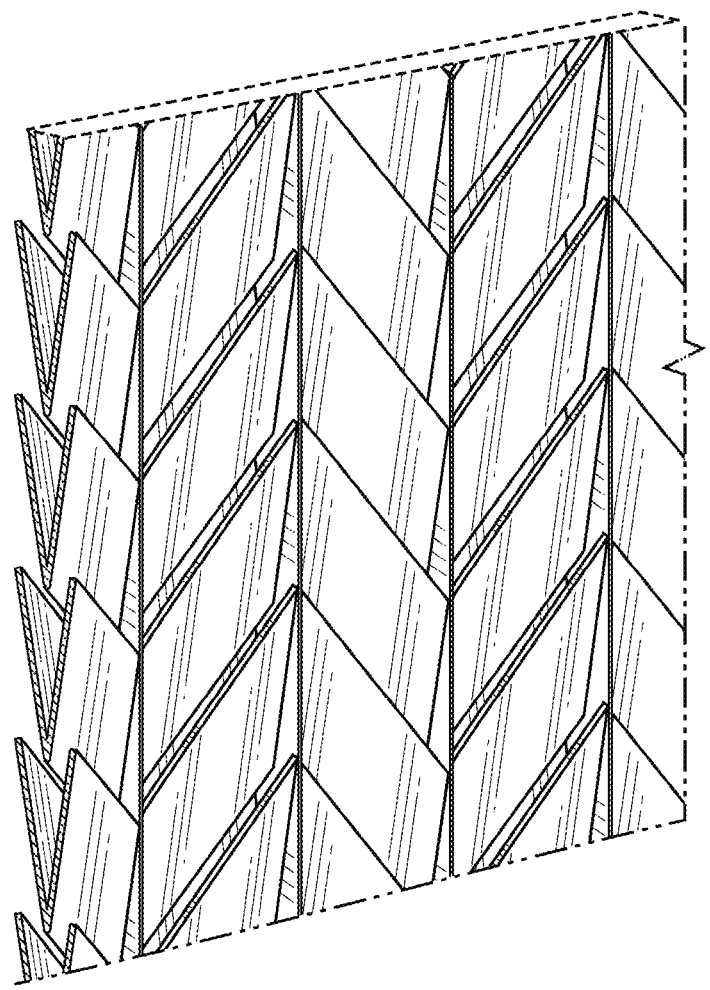
FIG. 17 is another cross sectional perspective view of a portion of the outer wall of the heat management device illustrated in FIG. 7.
Figure 18:
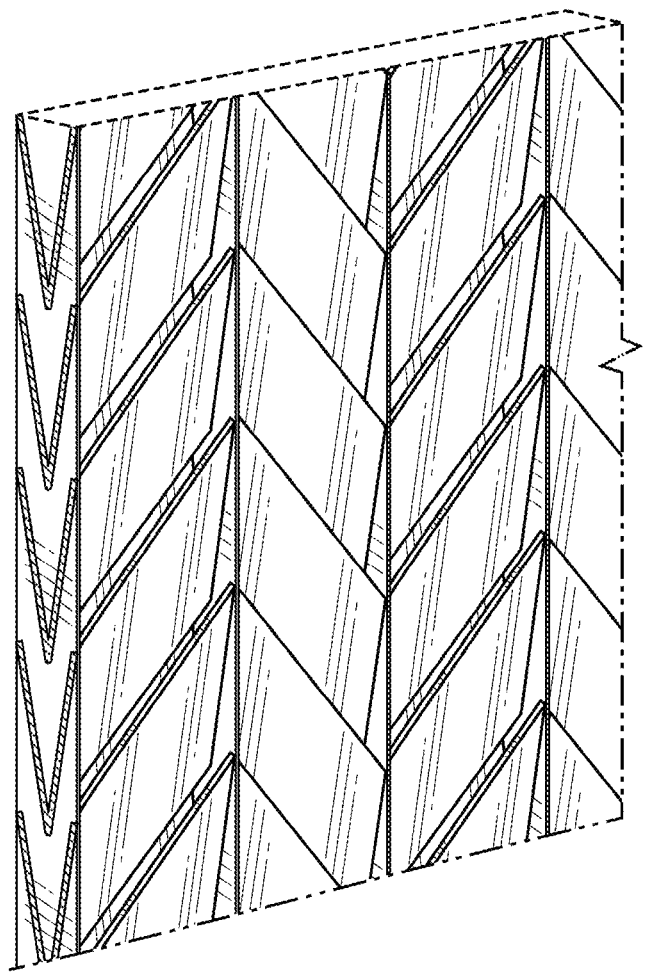
FIG. 18 is another cross sectional perspective view of a portion of the outer wall of the heat management device illustrated in FIG. 7.

FIG. 7 is an isometric view of a heat management device having channels defined by columns and horizontal blinds, in accordance with some embodiments. The heat management device of FIG. 7 may correspond to the heat management device 200 illustrated in FIG. 2. FIGS. 8-13 illustrate top, bottom, left, right, front, and back views of the heat management device of FIG. 7. FIG. 14 is an isometric cross-section view of the heat management device illustrated in FIG. 7. FIG. 15 is a head-on cross sectional view of a portion of the outer wall of the heat management device illustrated in FIG. 7 as indicated in FIG. 12. FIGS. 16-18 are cross sectional perspective views of different portions of the outer wall of the heat management device illustrated in FIG. 7 as indicated in FIG. 12.

Figure 19:
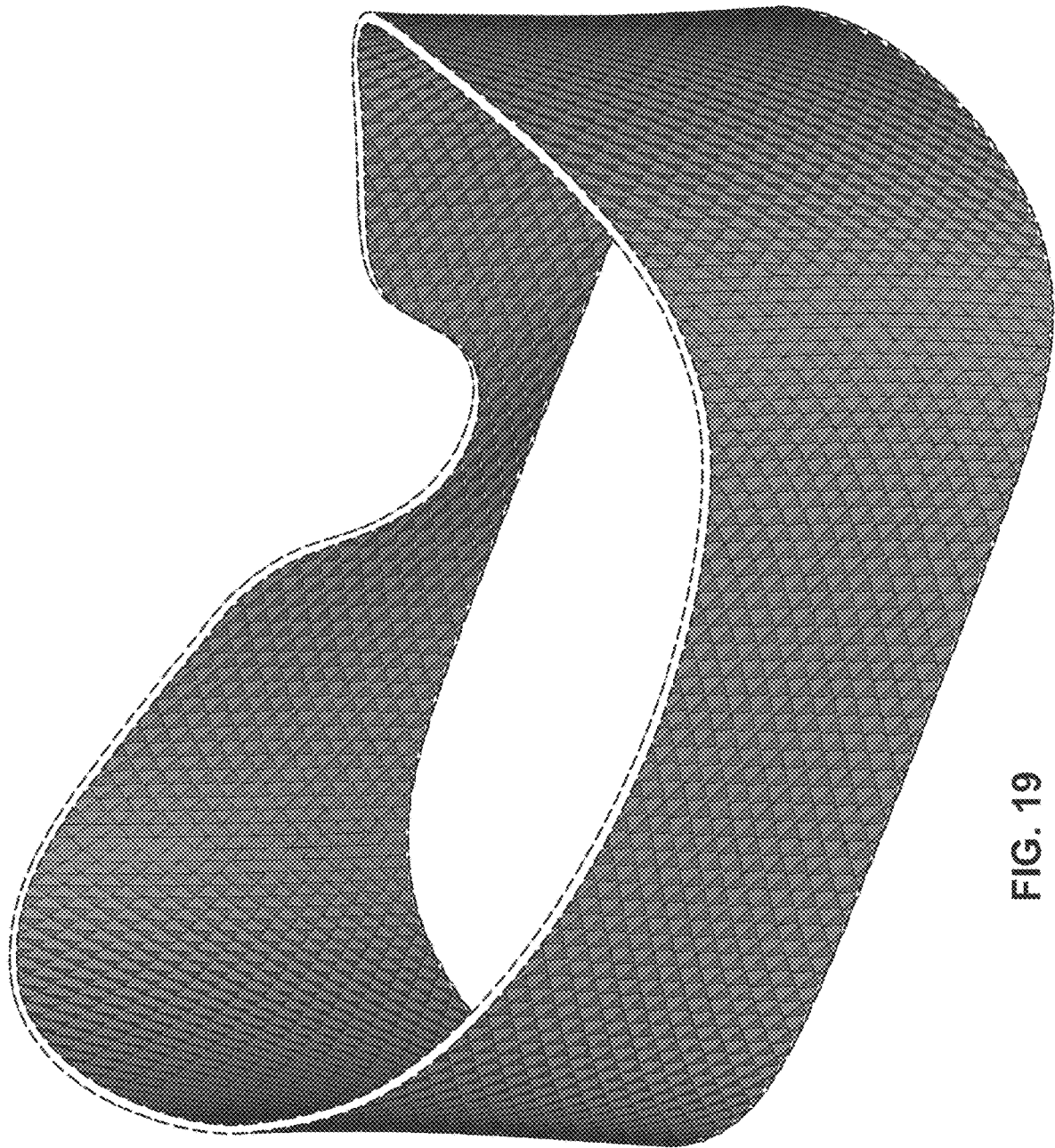
FIG. 19 is an isometric view of a heat management device having channels defined by diagonal strips, in accordance with some embodiments.
Figure 20:
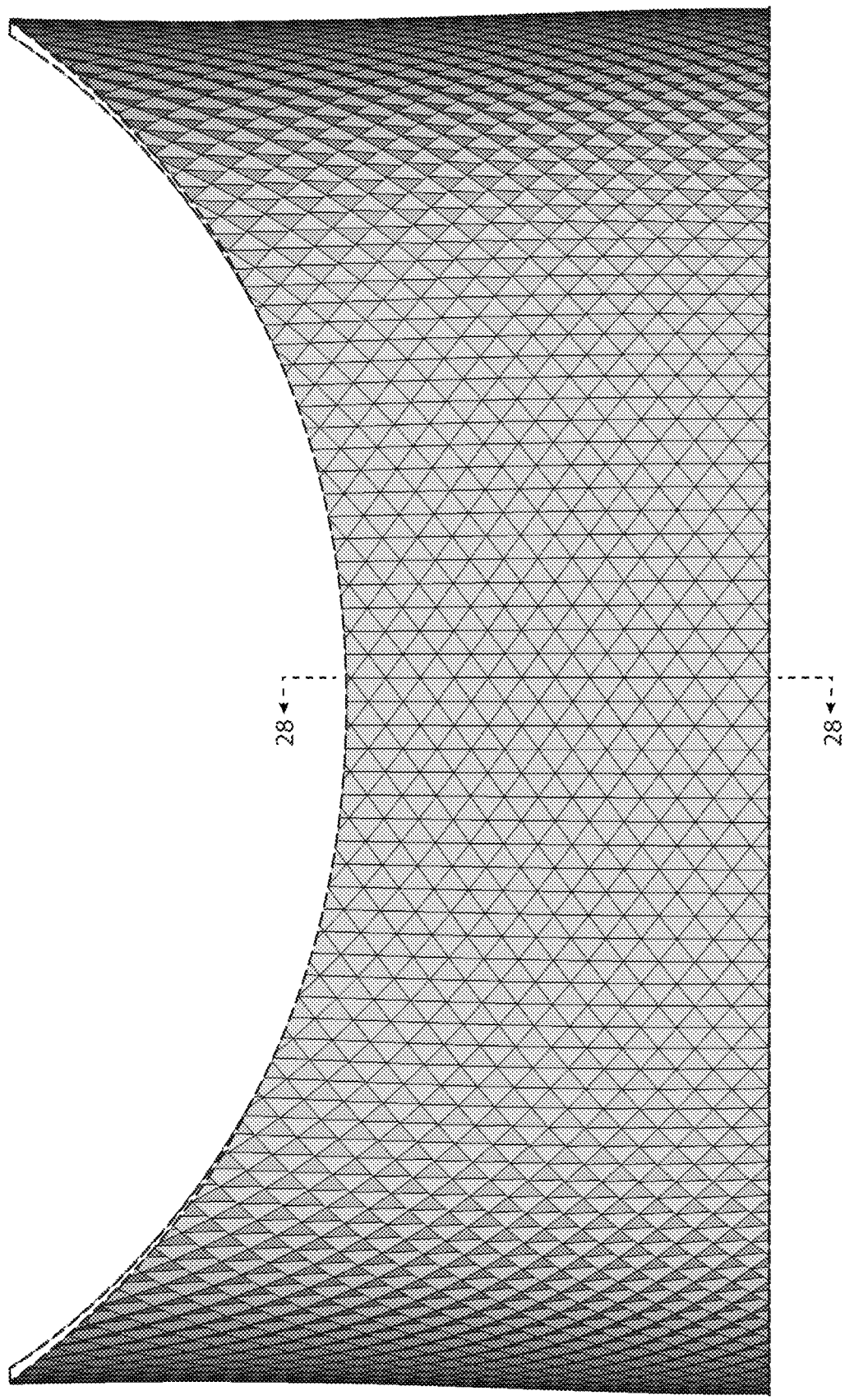
FIG. 20 is a top view of the heat management device illustrated in FIG. 19.
Figure 21:
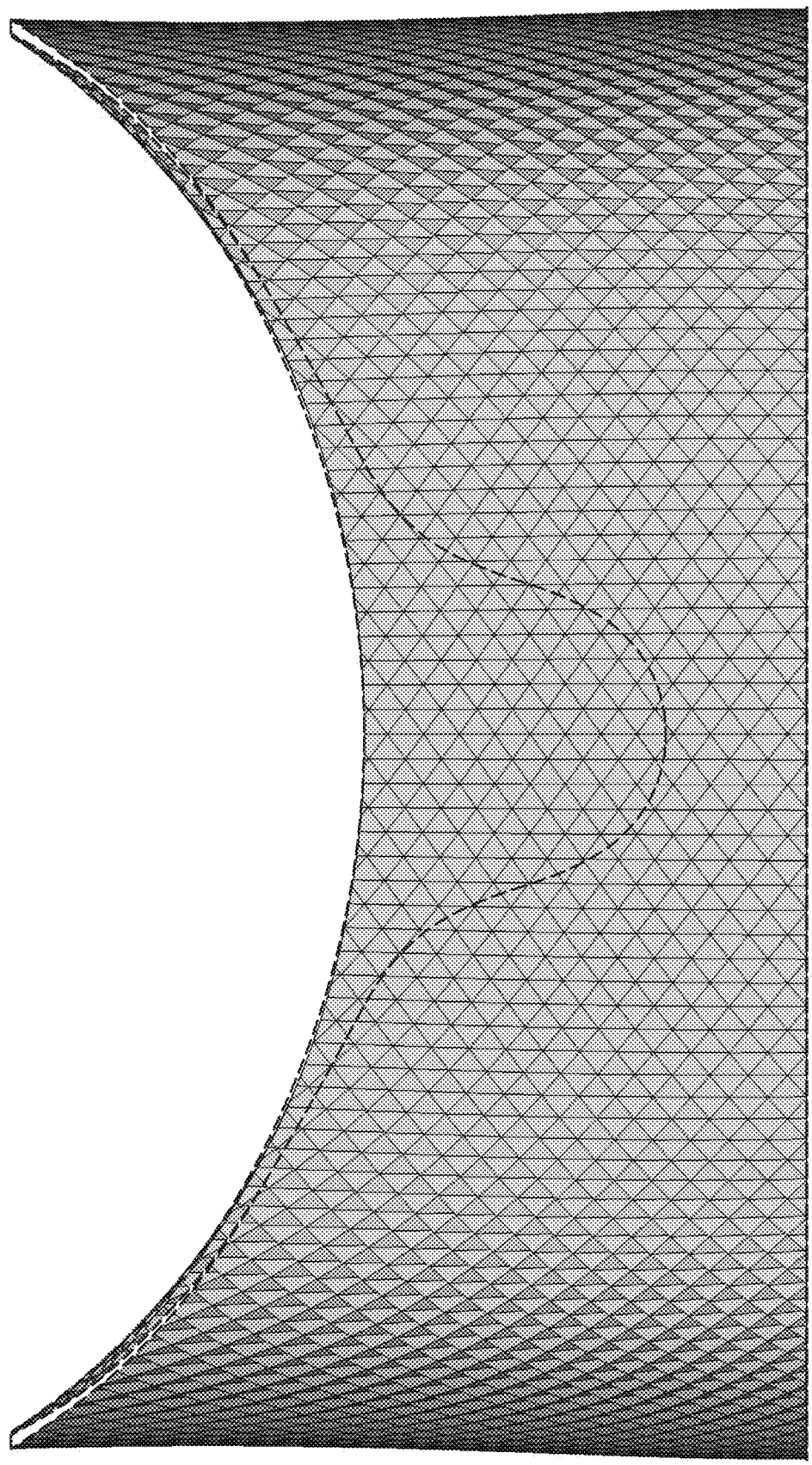
FIG. 21 is a bottom view of the heat management device illustrated in FIG. 19.
Figure 22:
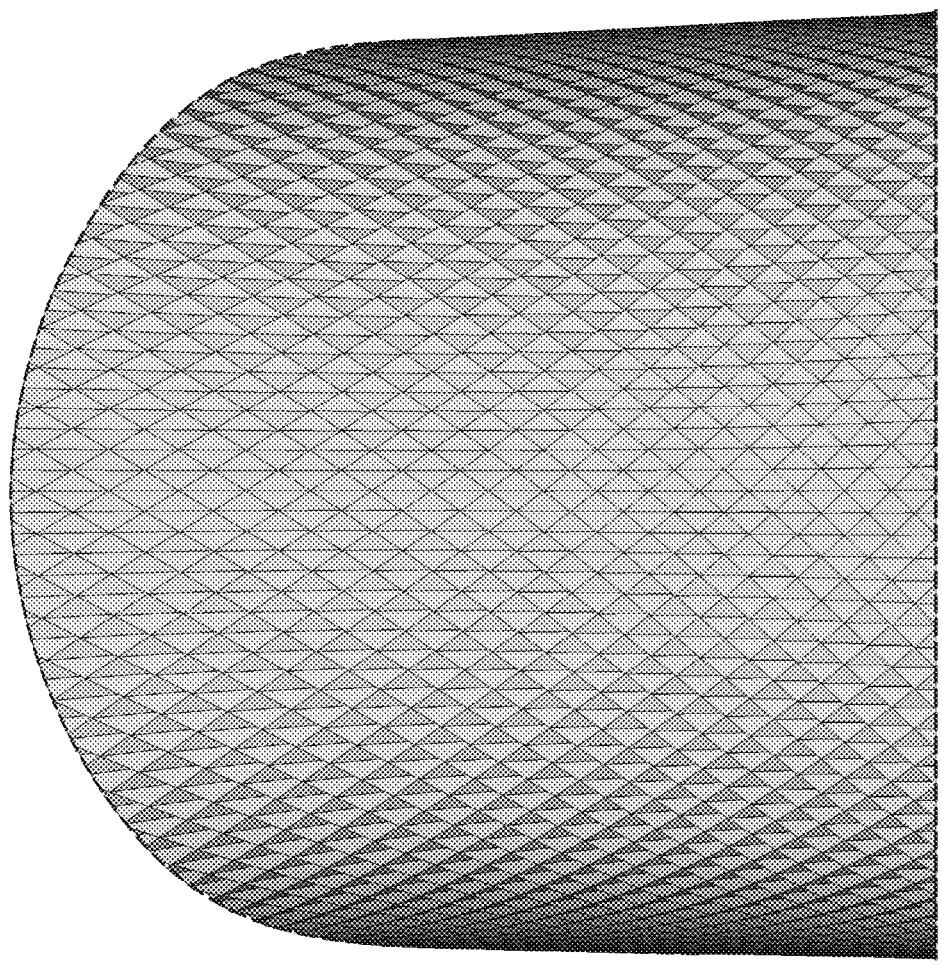
FIG. 22 is a left view of the heat management device illustrated in FIG. 19.
Figure 23:
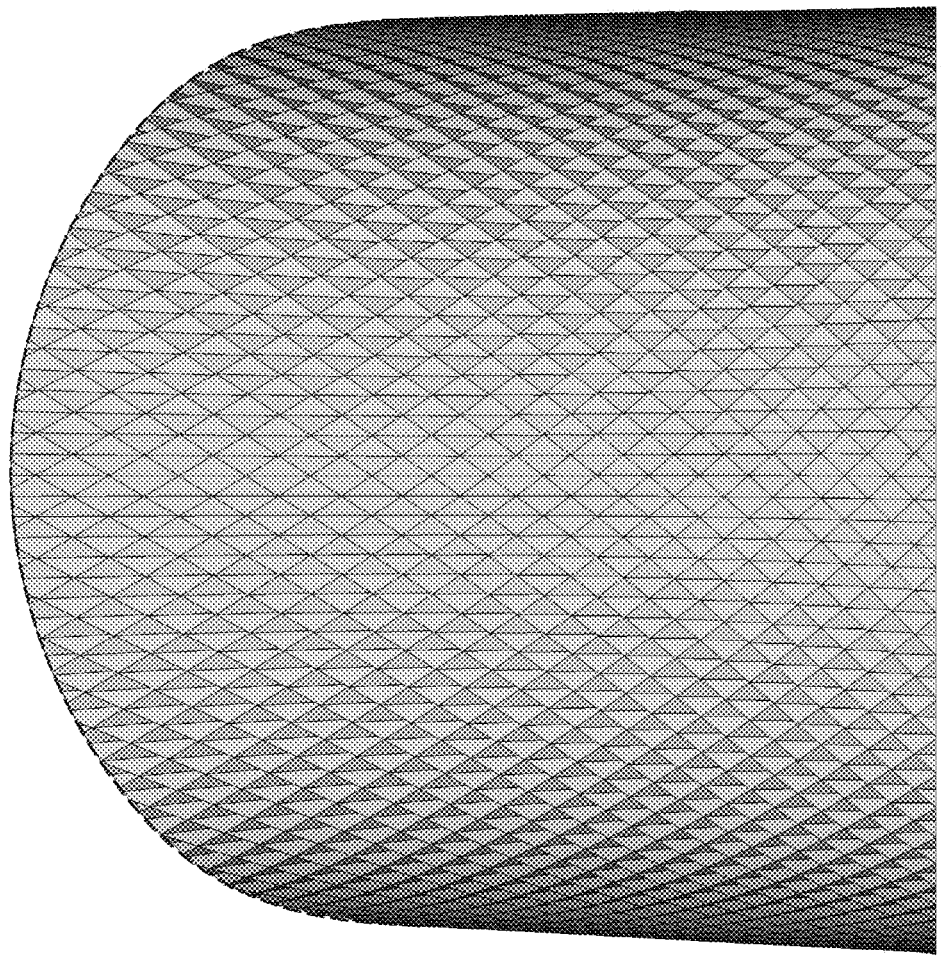
FIG. 23 is a right view of the heat management device illustrated in FIG. 19.
Figure 24:
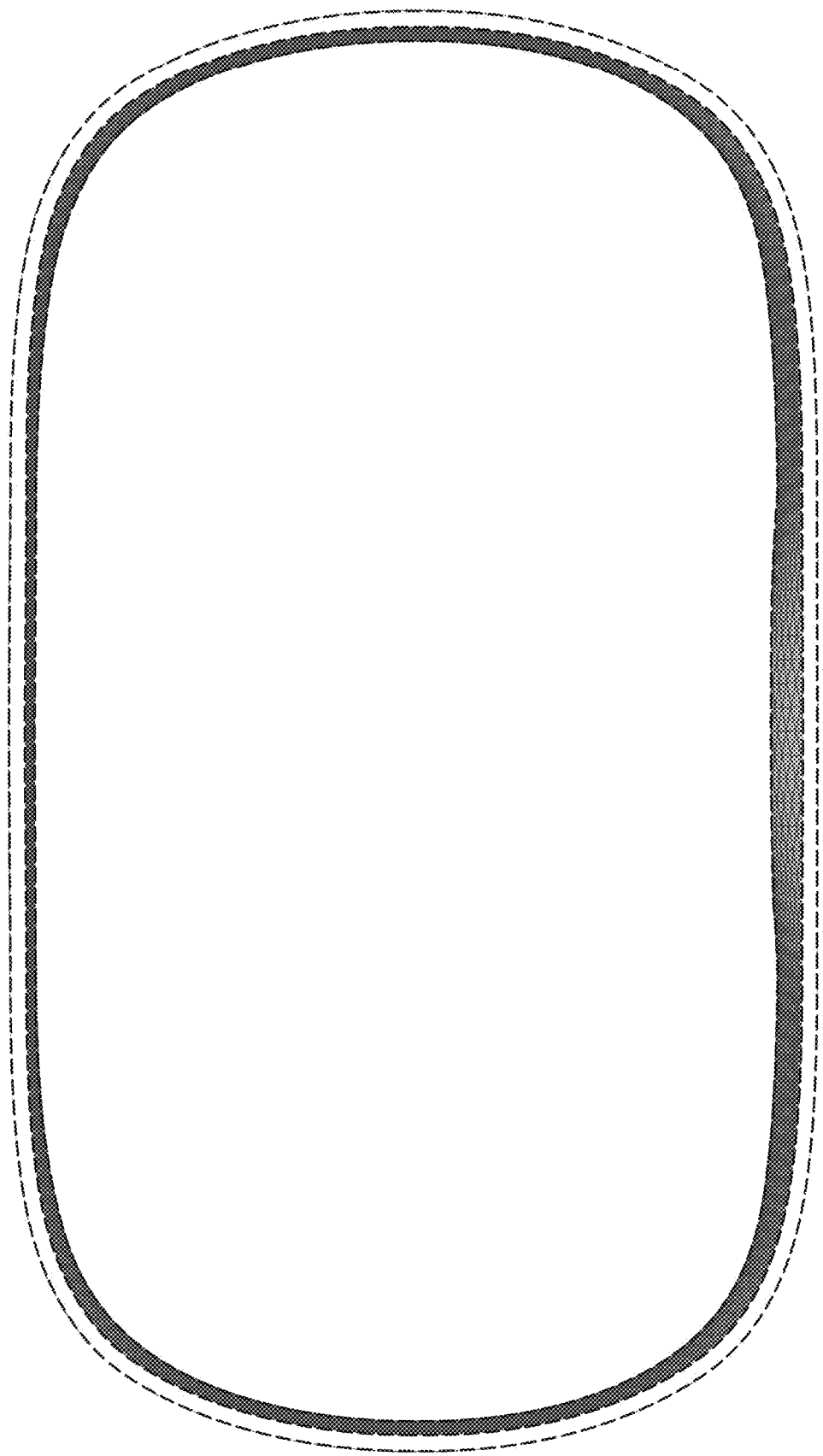
FIG. 24 is a front view of the heat management device illustrated in FIG. 19.
Figure 25:
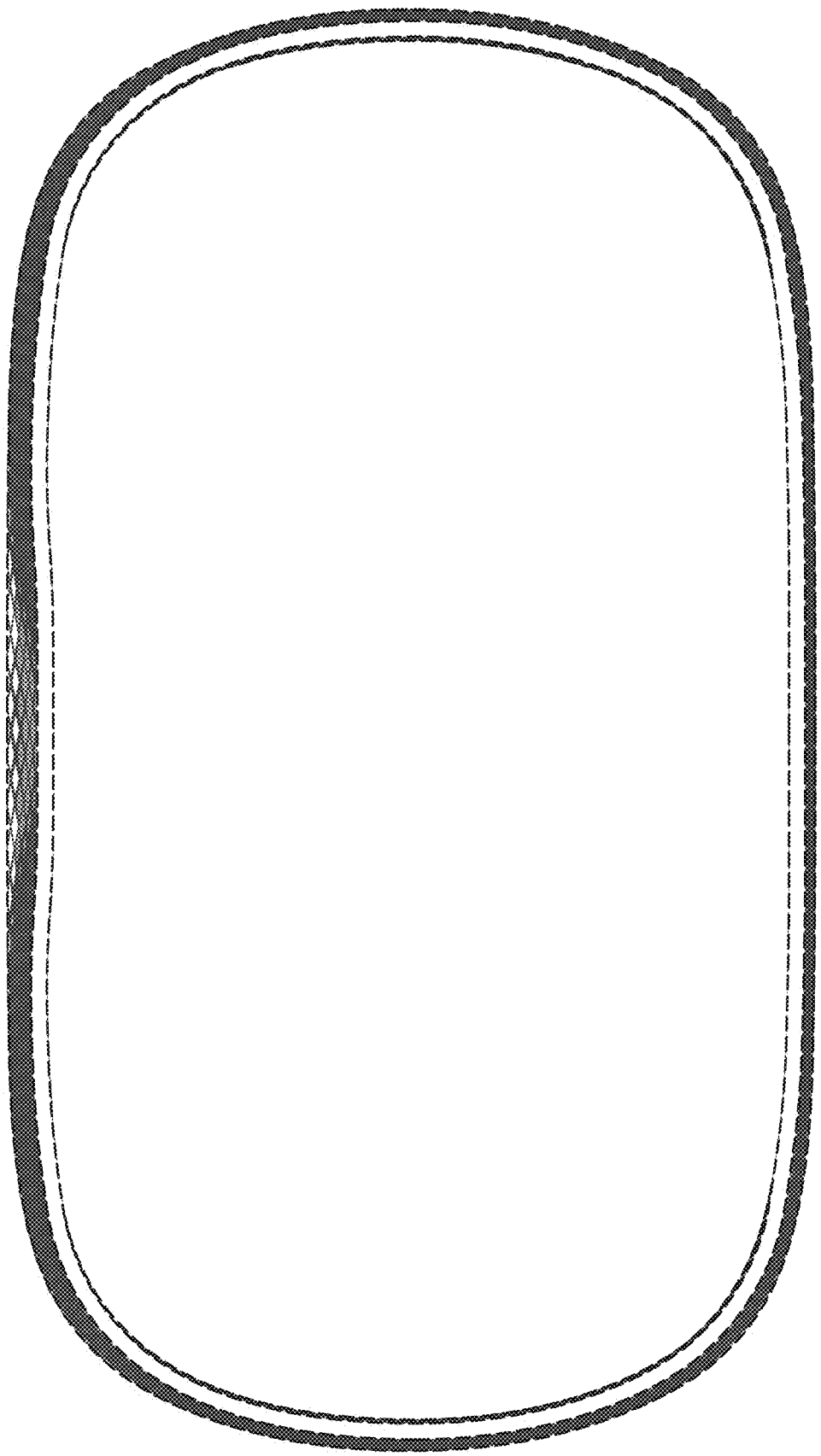
FIG. 25 is a back view of the heat management device illustrated in FIG. 19.
Figure 26:
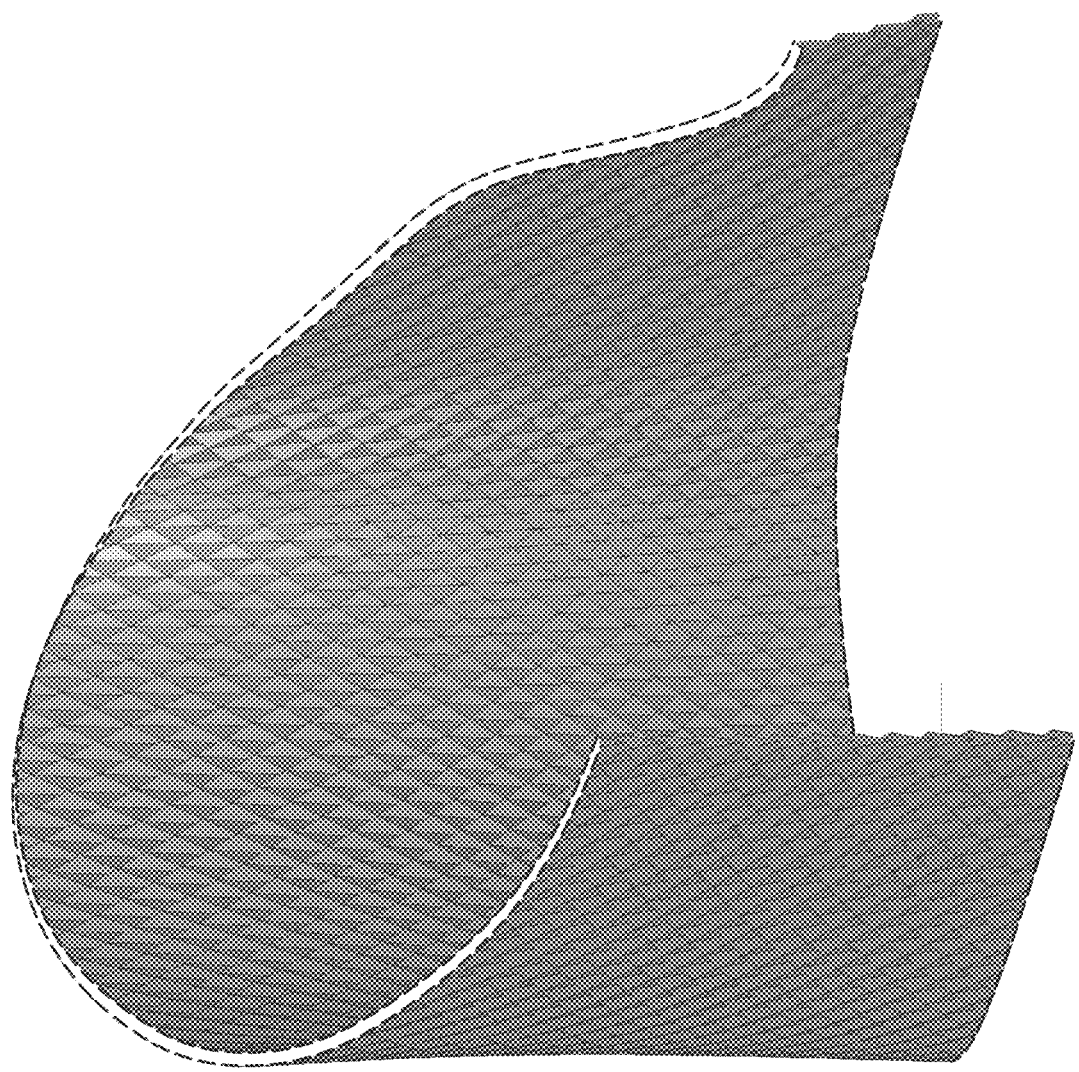
FIG. 26 is an isometric cross-section view of the heat management device illustrated in FIG. 19.
Figure 27:
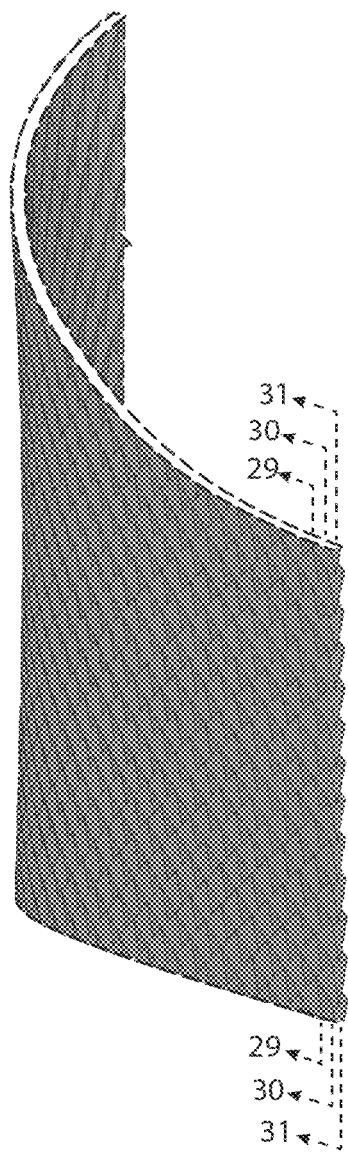
FIG. 27 is an isometric cross-section view of the heat management device illustrated in FIG. 19.
Figure 28:
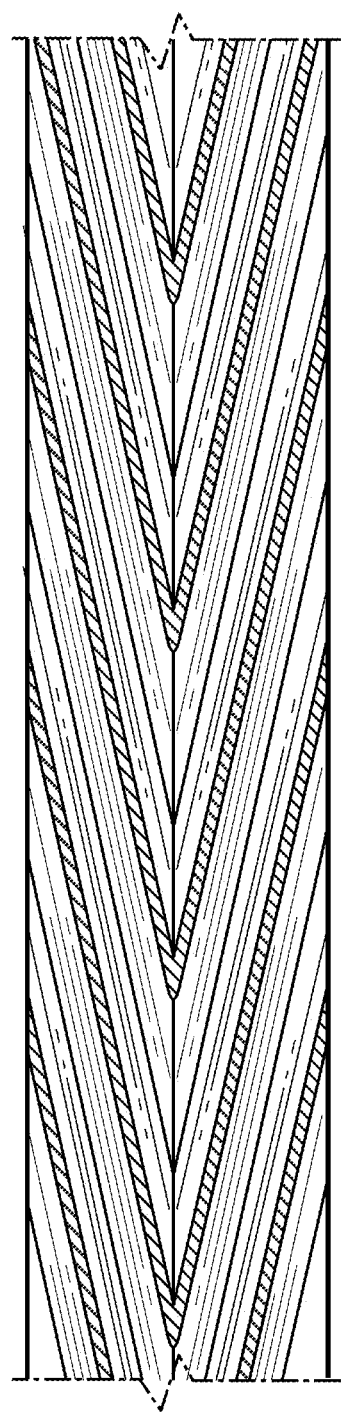
FIG. 28 is a head-on cross sectional view of a portion of the outer wall of the heat management device illustrated in FIG. 19.
Figure 29:
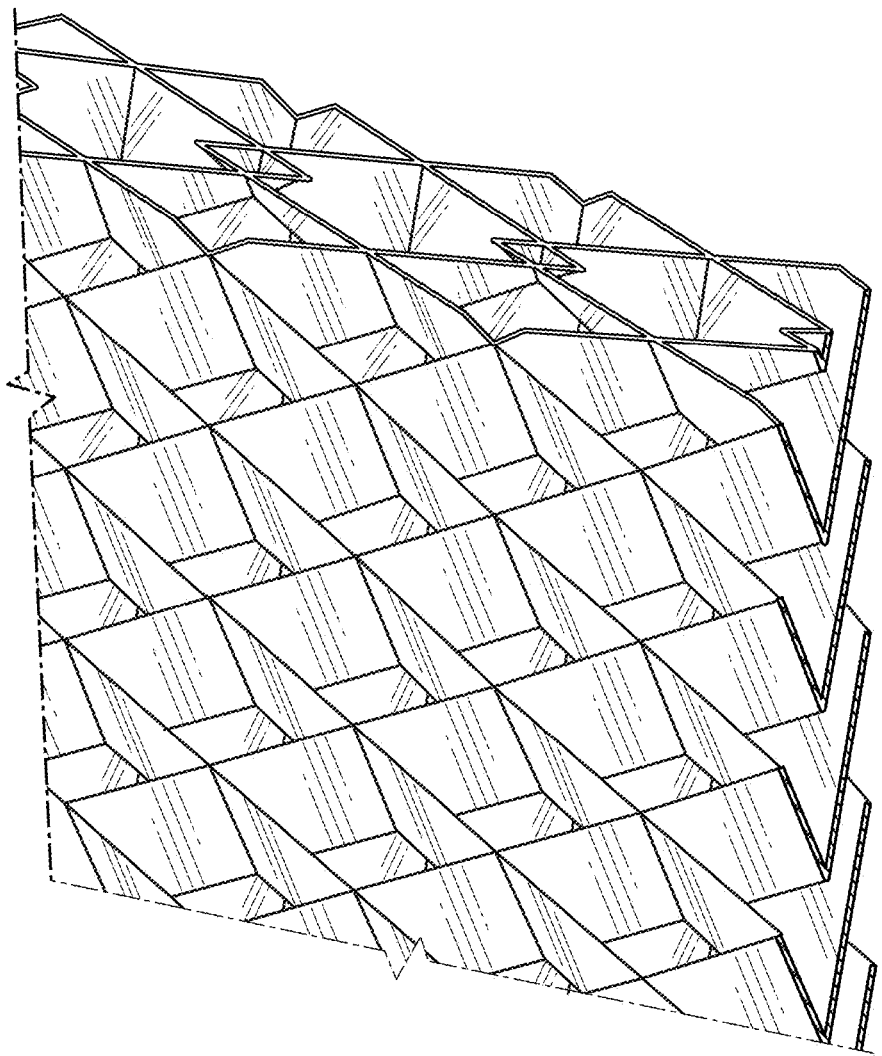
FIG. 29 is a cross sectional perspective view of a portion of the outer wall of the heat management device illustrated in FIG. 19.
Figure 30:
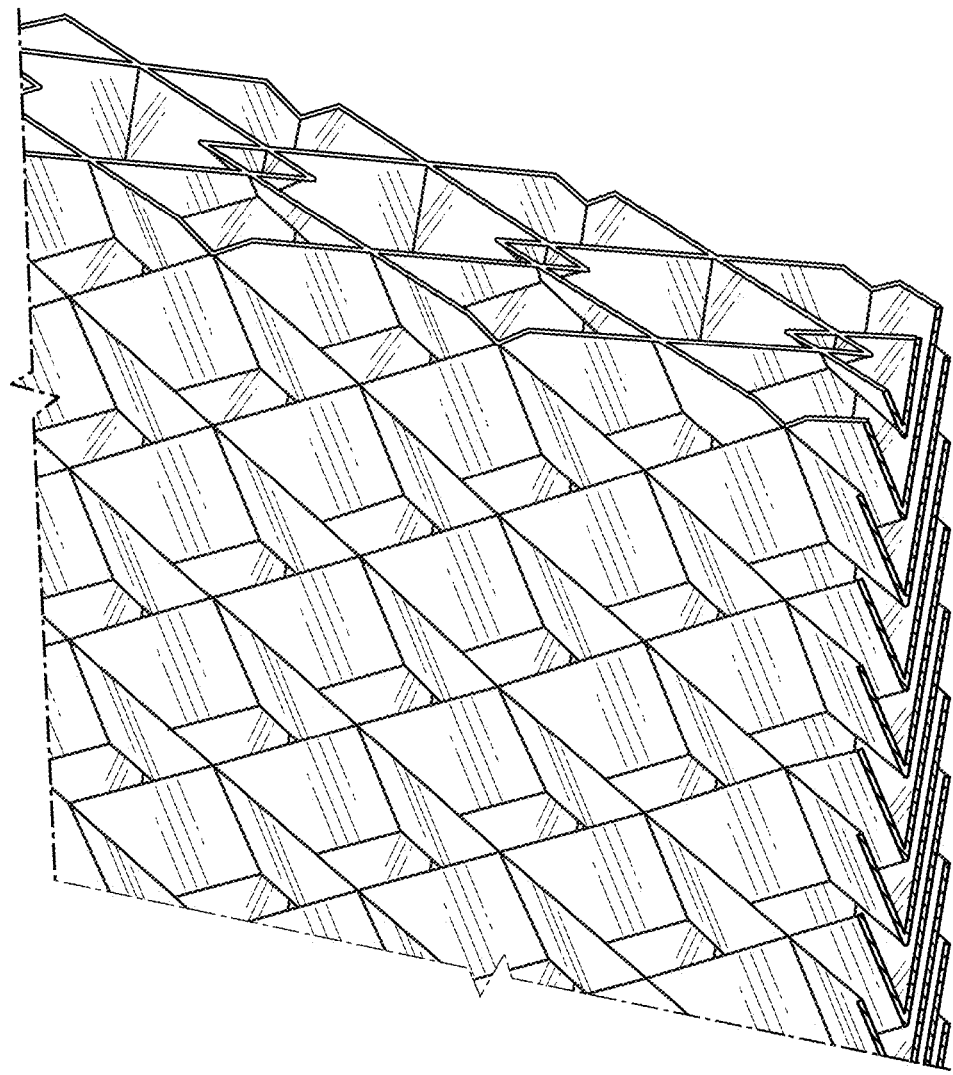
FIG. 30 is another cross sectional perspective view of a portion of the outer wall of the heat management device illustrated in FIG. 19.
Figure 31:
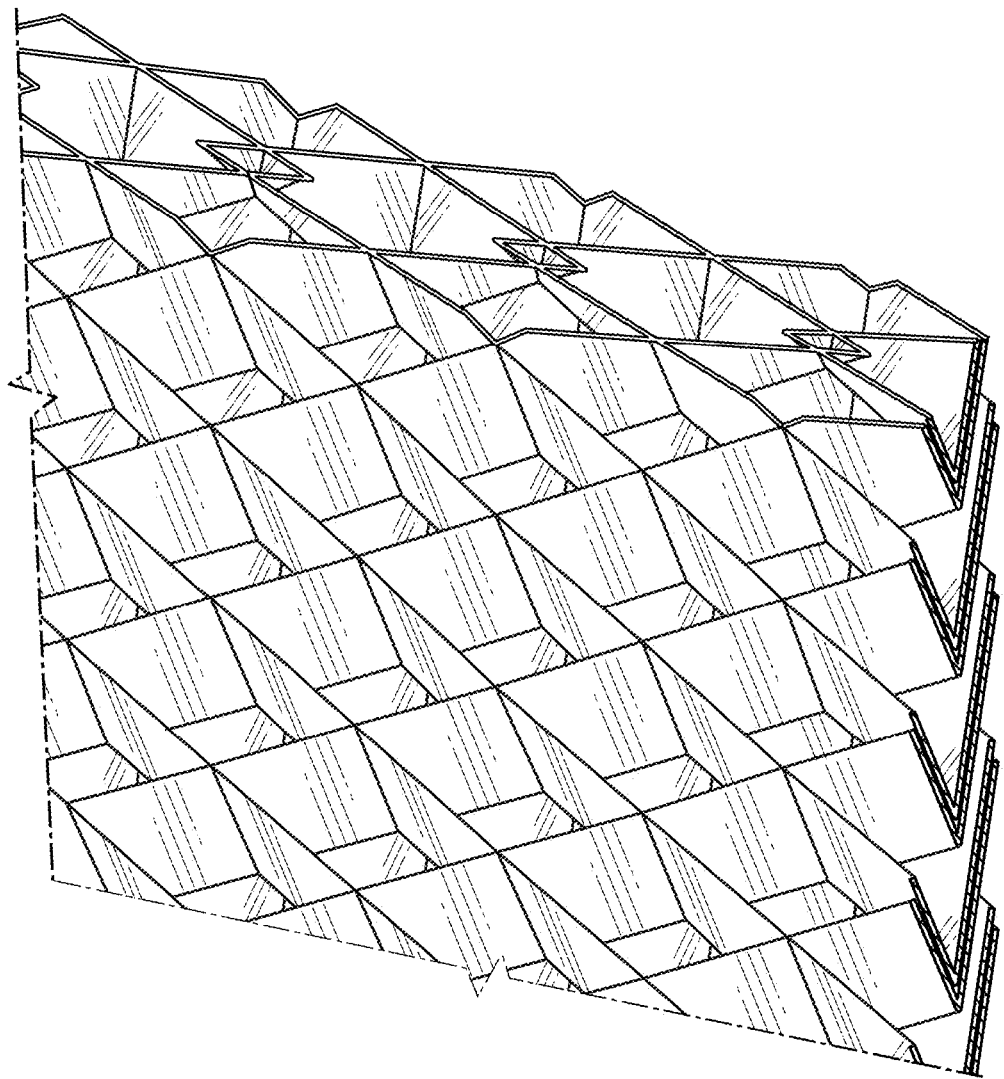
FIG. 31 is another cross sectional perspective view of a portion of the outer wall of the heat management device illustrated in FIG. 19.

FIG. 19 is an isometric view of a heat management device having channels defined by diagonal strips, in accordance with some embodiments. The heat management device of FIG. 19 may correspond to the heat management device 400 illustrated in FIG. 4. FIGS. 20-25 are top, bottom, left, right, front, and back views of the heat management device illustrated in FIG. 19. FIGS. 26 and 27 are isometric cross-section views of the heat management device illustrated in FIG. 19. FIG. 28 is a head on cross sectional view of a portion of the outer wall of the heat management device illustrated in FIG. 19 indicated in FIG. 20. FIGS. 29-31 are cross sectional perspective view of a portions of the outer wall of the heat management device illustrated in FIG. 19 as indicated in FIG. 27.

Although the views of the heat management devices illustrated in FIGS. 8-31 may illustrate heat management devices having certain colors or shades, it is understood that in other embodiments, heat management devices may be constructed to have colors or shades other than those illustrated herein.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, in relation to manufacturing processes. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described (e.g., in relation to manufacturing processes.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A heat management device, comprising:
a body having at least one outer wall that partially encloses a chamber, the body configured to be positioned adjacent to a surface of a heat source;
wherein at least a portion of the at least one outer wall comprises an inner surface, an outer surface, and a plurality of channels traversing the outer wall to connect the inner surface to the outer surface, and each channel comprises a first portion extending from the outer surface and a second portion extending from the inner surface, the first portion and the second portion of the channel connecting at an acute angle, such that light entering the first portion of the channel does not have a direct path through the second portion of the channel.

2. The heat management device of claim 1, wherein the heat management device and the heat source are components of a head-mounted display (HMD).

3. The heat management device of claim 2, wherein the heat management device forms at least portion of a frame of the HMD, and wherein the heat source is an electronic component of the HMD physically mounted to the body of the heat management device, such that the heat management device provides structural support for the electronic component.

4. The heat management device of claim 2, wherein the body has one or more eye cups extending from the at least one outer wall, and each eye cup is configured to receive at least one optical component of the HMD.

5. The heat management device of claim 2, wherein the body is coupled to one or more eye cups that are configured to receive at least one optical component of the HMD.

6. The heat management device of claim 1, wherein air is able to flow between the inner and outer surfaces of the at least one outer wall via the plurality of channels.

7. The heat management device of claim 1, wherein the body is at least partially composed of a thermally conductive material.

8. The heat management device of claim 1, wherein the body is at least partially composed of a selective laser melting (SLM)-printed material.

9. The heat management device of claim 8, wherein the SLM-printed material comprises at least one of a titanium-derived material, a tungsten-derived material, and a steel-derived material.

10. The heat management device of claim 1, wherein the body is monolithic.

11. The heat management device of claim 1, wherein the plurality of channels are arranged in an array of rows and columns.

12. The heat management device of claim 11, wherein the outer wall comprises a plurality of column dividers spanning between the inner and outer surface of the outer wall, the column dividers separating the columns of channels of the outer wall.

13. The heat management device of claim 12, wherein the plurality of vertical dividers are connected by a plurality of horizontal blinds spanning horizontally across a width of the outer wall, each of the plurality horizontal blinds having a v-shaped cross-section between the inner and outer surfaces of the outer wall, such that the plurality of horizontal blinds define a top and bottom surface of each of the plurality of channels of the outer wall.

14. The heat management device of claim 1, wherein the plurality of channels are arranged in a diagonal array pattern.

15. The heat management device of claim 1, wherein the first portion and the second portion of each channel connect at an angle of between 15° and 60°.

16. The heat management device of claim 1, wherein the at least one outer wall has a thickness between 0.4 cm and 1 cm.

17. A head-mounted display (HMD) comprising:
an electronic display; and
a heat management device comprising:
a monolithic body having at least one outer wall that partially encloses a chamber retaining the electronic display in position, the body configured to be positioned adjacent and coupled to one or more heat-generating surfaces of the electronic display;
wherein at least a portion of the at least outer wall comprises an inner surface, an outer surface, and a plurality of channels traversing the outer wall to connect the inner surface to the outer surface, and each channel comprises a first portion extending from the outer surface and a second portion extending from the inner surface, the first portion and the second portion of the channel connecting at an acute angle, such that light entering the first portion of the channel does not have a direct path through the second portion of the channel.

18. The HMD of claim 17, wherein the body of the heat management device has one or more eye cups extending from the at least one outer wall, and each eyecup structure is configured to receive at least one optical component of the HMD.

19. The HMD of claim 17, wherein the body comprises a selective laser melting (SLM)-printed material.

20. The HMD of claim 17, wherein air is able to flow between the inner and outer surfaces of the at least one outer walls via the plurality of channels.

* * * * *